United States Patent [19]

Raterman et al.

[11] Patent Number: 5,295,196

[45] Date of Patent: Mar. 15, 1994

[54] METHOD AND APPARATUS FOR CURRENCY DISCRIMINATION AND COUNTING

[75] Inventors: Donald E. Raterman, Deerfield; Bradford T. Graves; Lars R. Stromme, both of Arlington Heights, all of Ill.; Aaron M. Bauch, Boxborrow, Mass.

[73] Assignee: Cummins-Allison Corp., Mt. Prospect, Ill.

[21] Appl. No.: 885,648

[22] Filed: May 19, 1992

Related U.S. Application Data

[63] Continuation-in-part of Ser. No. 475,111, Feb. 5, 1990, abandoned.

[51] Int. Cl.$^5$ .............................................. G06K 9/00
[52] U.S. Cl. ............................................ 382/7; 382/34
[58] Field of Search ................... 382/7, 34; 356/71; 385/449; 358/486, 496, 498, 412

[56] References Cited

U.S. PATENT DOCUMENTS

| 3,509,535 | 6/1966 | Berube ................................. 340/149 |
| 3,612,835 | 10/1971 | Andrews et al. ............ 235/61.11 D |
| 3,870,629 | 3/1975 | Carter et al. ...................... 209/111.8 |
| 3,906,449 | 9/1975 | Marchak ......................... 340/149 R |
| 3,976,198 | 8/1976 | Carnes et al. ................. 209/111.7 T |
| 4,041,456 | 8/1977 | Ott et al. ....................... 340/146.3 R |
| 4,096,991 | 6/1978 | Iguchi ................................. 235/419 |
| 4,147,430 | 4/1979 | Gorgone et al. ...................... 356/51 |
| 4,179,685 | 12/1979 | O'Maley ....................... 340/146.3 H |
| 4,283,708 | 8/1981 | Lee ................................ 340/146.3 Z |
| 4,288,781 | 9/1981 | Sellner et al. .................. 340/146.30 |
| 4,302,781 | 11/1981 | Ikeda et al. .......................... 358/486 |
| 4,311,914 | 1/1982 | Huber ................................. 250/556 |
| 4,348,656 | 9/1982 | Gorgone et al. ............. 340/146.3 R |
| 4,349,111 | 9/1982 | Shah et al. .......................... 209/534 |
| 4,355,300 | 10/1982 | Weber ........................... 340/146.3 C |
| 4,356,473 | 10/1982 | Freudenthal ................ 340/146.3 H |
| 4,386,432 | 5/1983 | Nakamura et al. . |
| 4,442,541 | 4/1984 | Finkel et al. ............................. 382/7 |
| 4,461,028 | 7/1984 | Okubo ................................. 382/15 |

(List continued on next page.)

OTHER PUBLICATIONS

Mosler Inc. brochure "The Mosler/Toshiba CF-420", 1989.

AFB Currency Recognition System.

Primary Examiner—David K. Moore
Assistant Examiner—Phuoc Tran
Attorney, Agent, or Firm—Arnold, White & Durkee

[57] ABSTRACT

An improved method and apparatus for discriminating between currency bills of different denominations uses an optical sensing and correlation technique based on the sensing of bill reflectance characteristics obtained by illuminating and scanning a bill along its narrow dimension. A series of detected reflectance signals are obtained by sampling and digitally processing, under microprocessor control, the reflected light at a plurality of predefined sample points as a currency bill is moved across an illuminated strip with its narrow dimension parallel to the direction of transport of the bill. The sample data is subjected to digital processing, including a normalizing process, whereby the reflectance data represents a characteristic pattern that is unique for a given bill denomination and incorporates sufficient distinguishing features between characteristic patterns for discriminating between different currency denominations. A plurality of master characteristic patterns are generated and stored using original bills for each denomination of currency to be detected. The pattern generated by scanning a bill under test and processing the data samples is compared with each of the prestored master patterns to generate, for each comparison, a correlation number representing the extent of similarity between corresponding ones of the plurality of data samples for the compared patterns. Denomination identification is based on designating the scanned bill as belonging to the denomination corresponding to the stored master pattern for which the correlation number resulting from pattern comparison is determined to be the highest, subject to a bi-level threshold of correlation.

18 Claims, 30 Drawing Sheets

U.S. PATENT DOCUMENTS

| | | | |
|---|---|---|---|
| 4,464,787 | 8/1984 | Fish et al. | 382/7 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,556,140 | 12/1985 | Okada | 194/4 |
| 4,563,771 | 1/1986 | Gorgone et al. | 382/7 |
| 4,587,412 | 5/1986 | Apisdorf | 235/449 |
| 4,587,434 | 5/1986 | Roes et al. | 250/556 |
| 4,464,786 | 8/1984 | Nishito et al. | 382/7 |
| 4,592,090 | 5/1986 | Curl et al. | 382/7 |
| 4,628,194 | 12/1986 | Dobbins et al. | 235/379 |
| 4,645,936 | 2/1987 | Gorgone | 250/556 |
| 4,653,647 | 3/1987 | Hashimoto . | |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,823,393 | 4/1989 | Kawakami | 382/7 |
| 4,996,604 | 2/1991 | Ogawa et al. | 358/486 |
| 5,047,871 | 9/1991 | Meyer et al. | 358/486 |
| 5,068,519 | 11/1991 | Bryce . | |

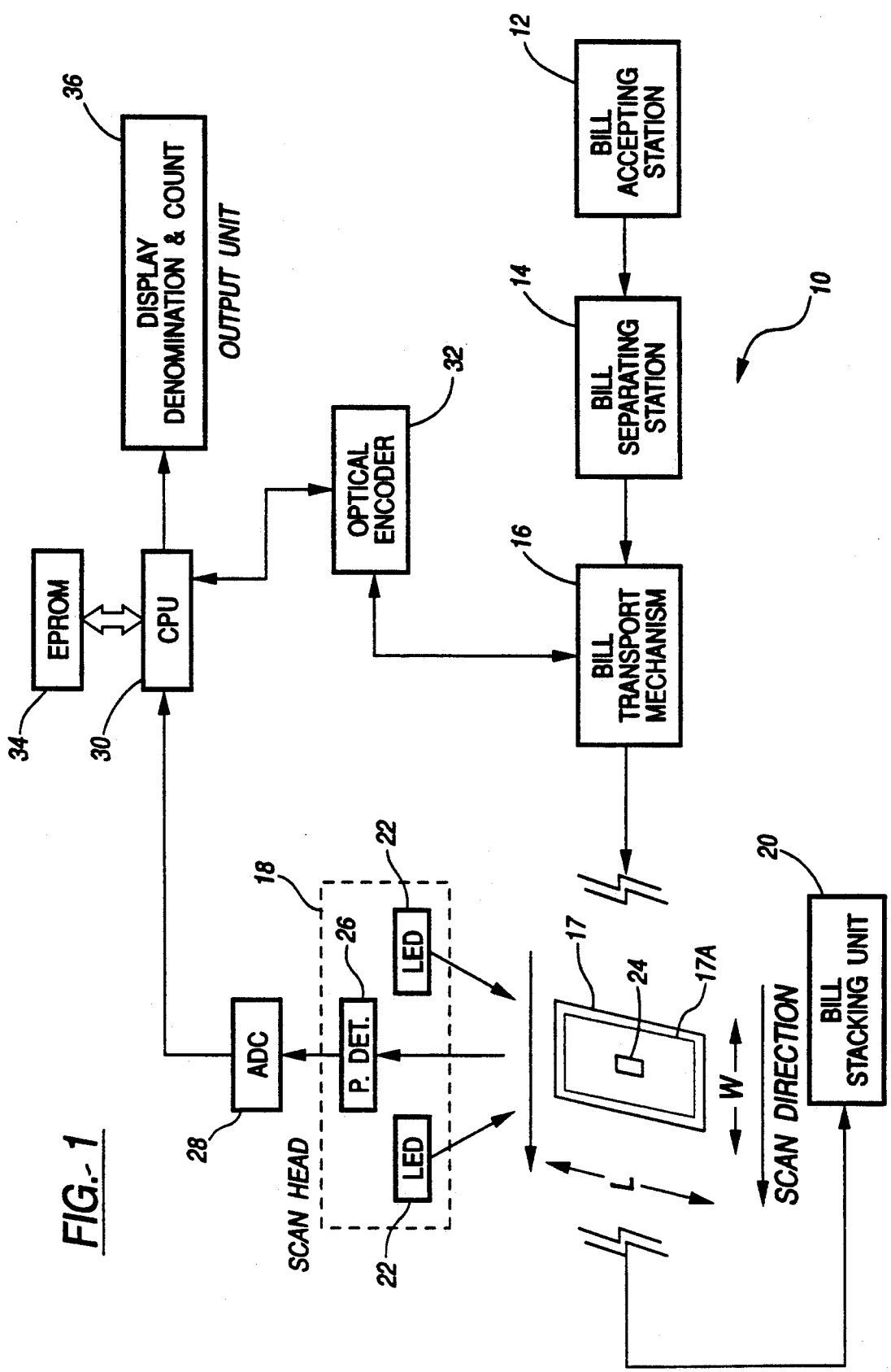

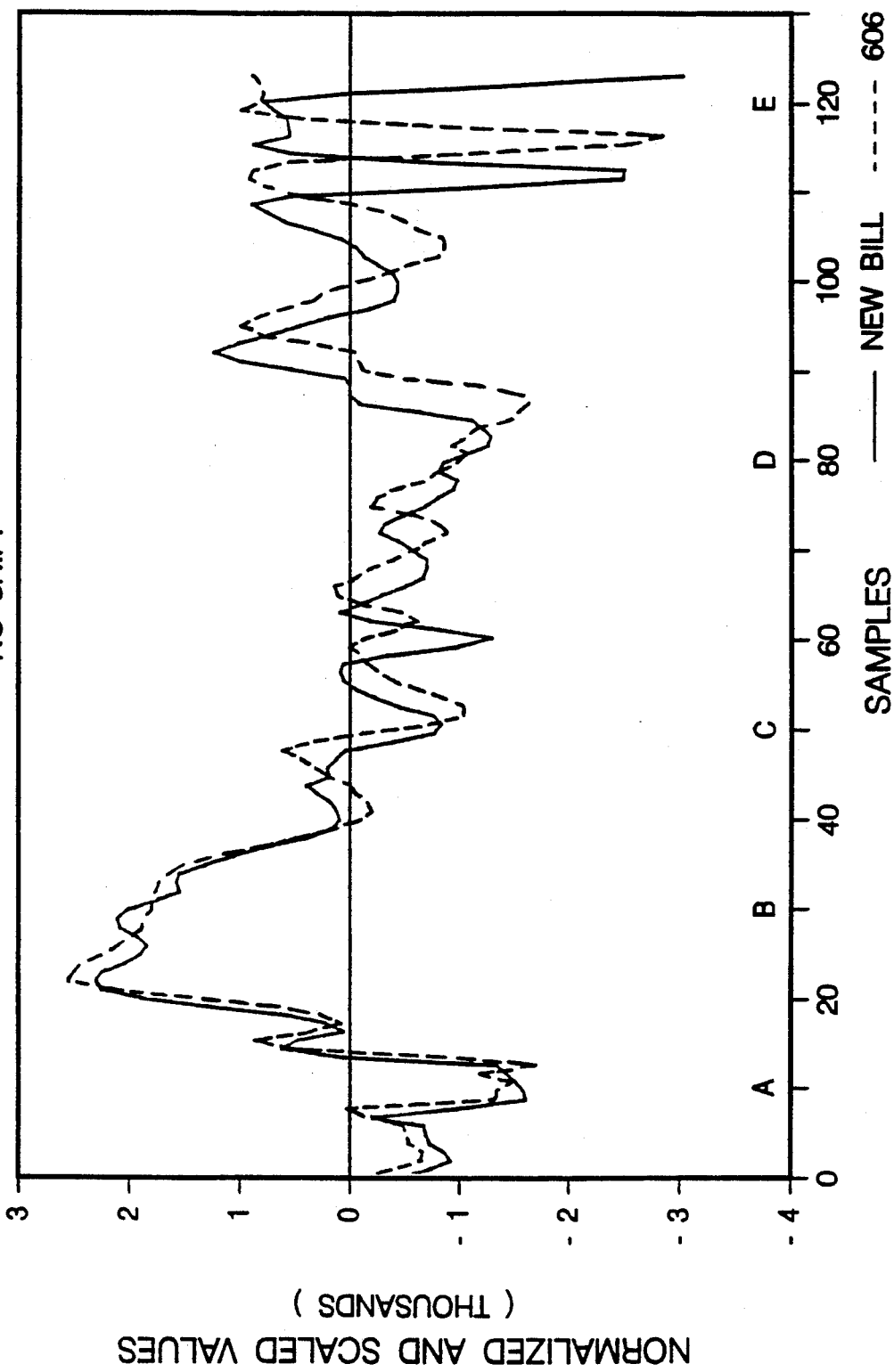

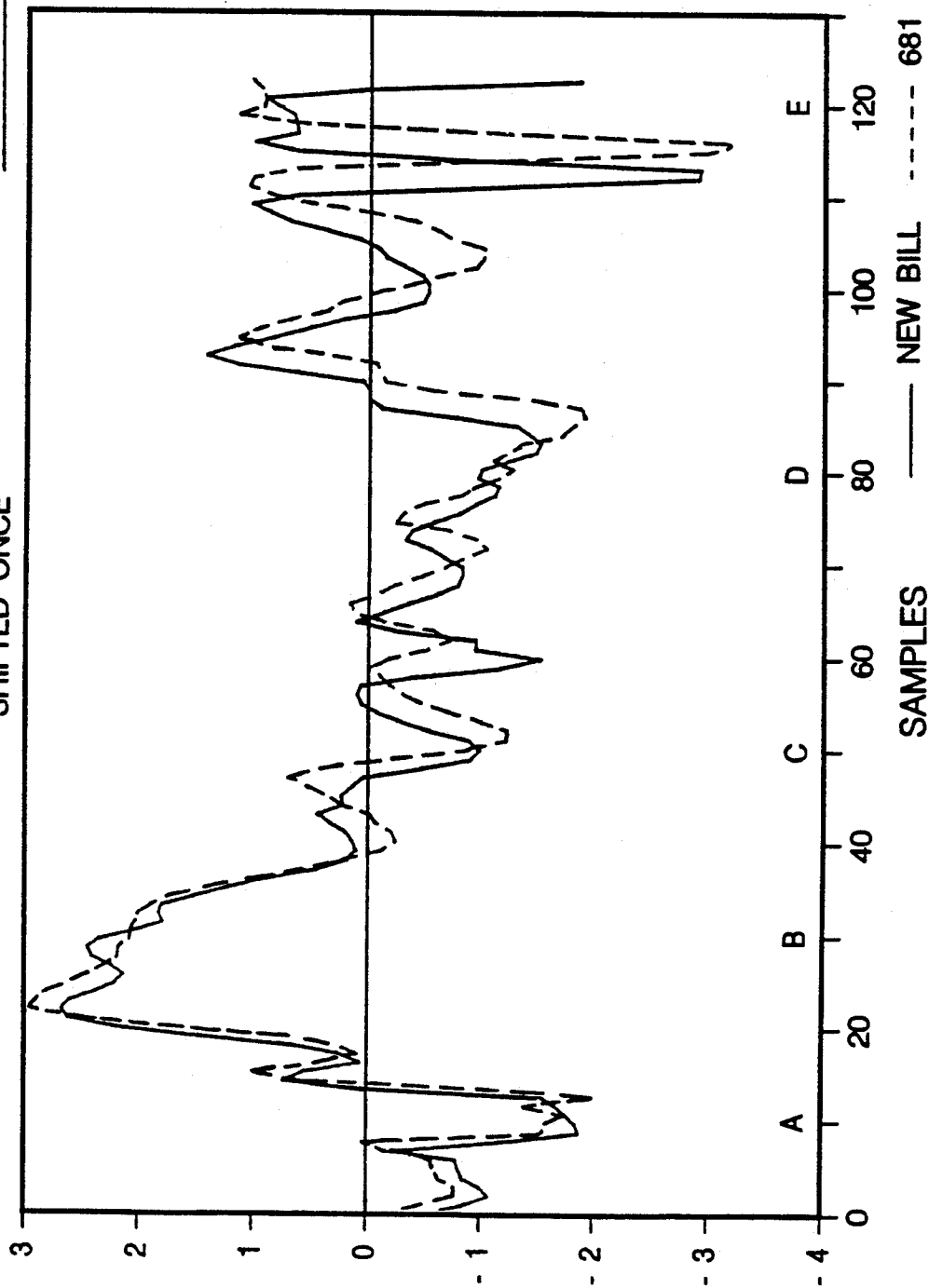

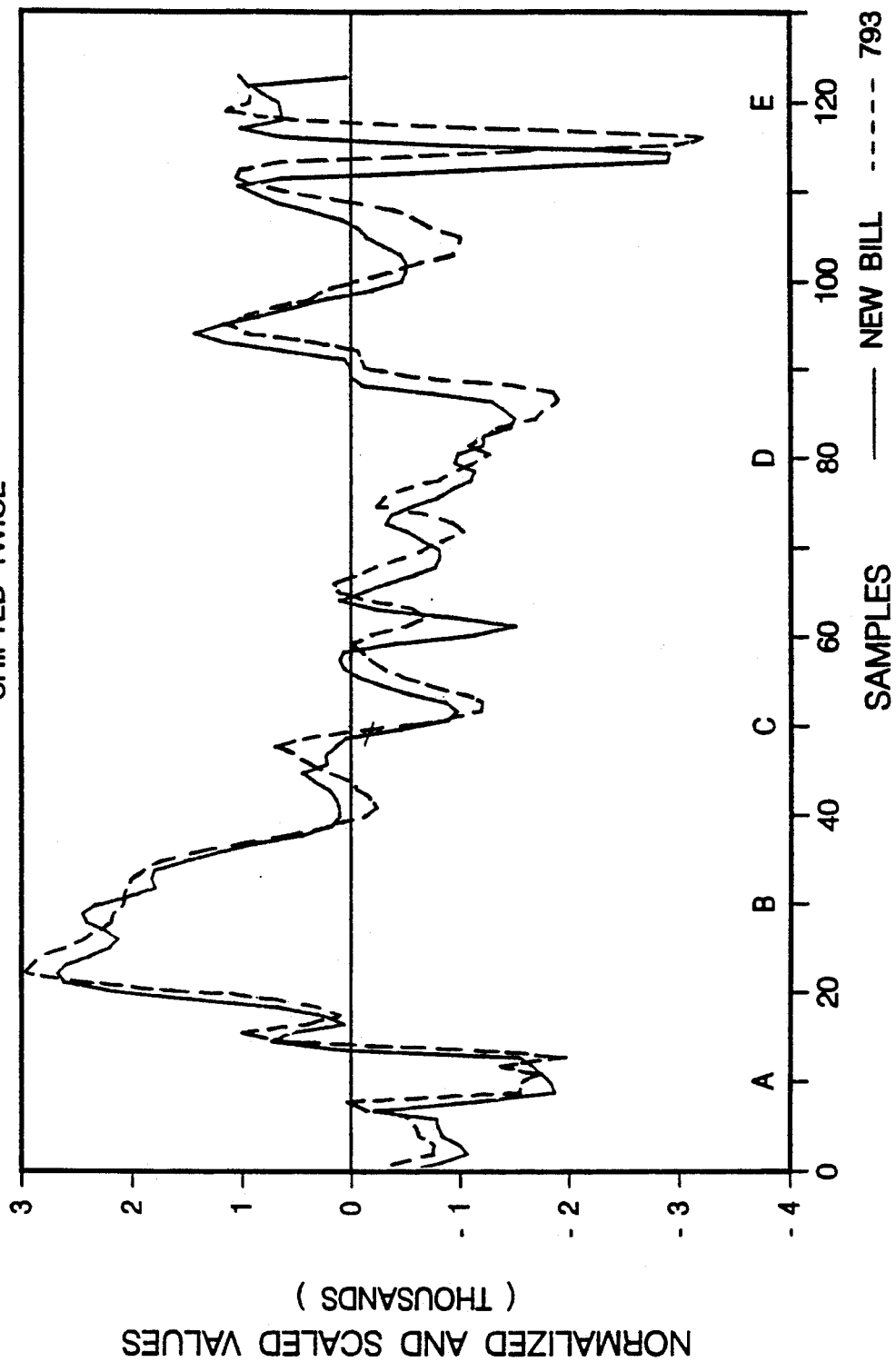

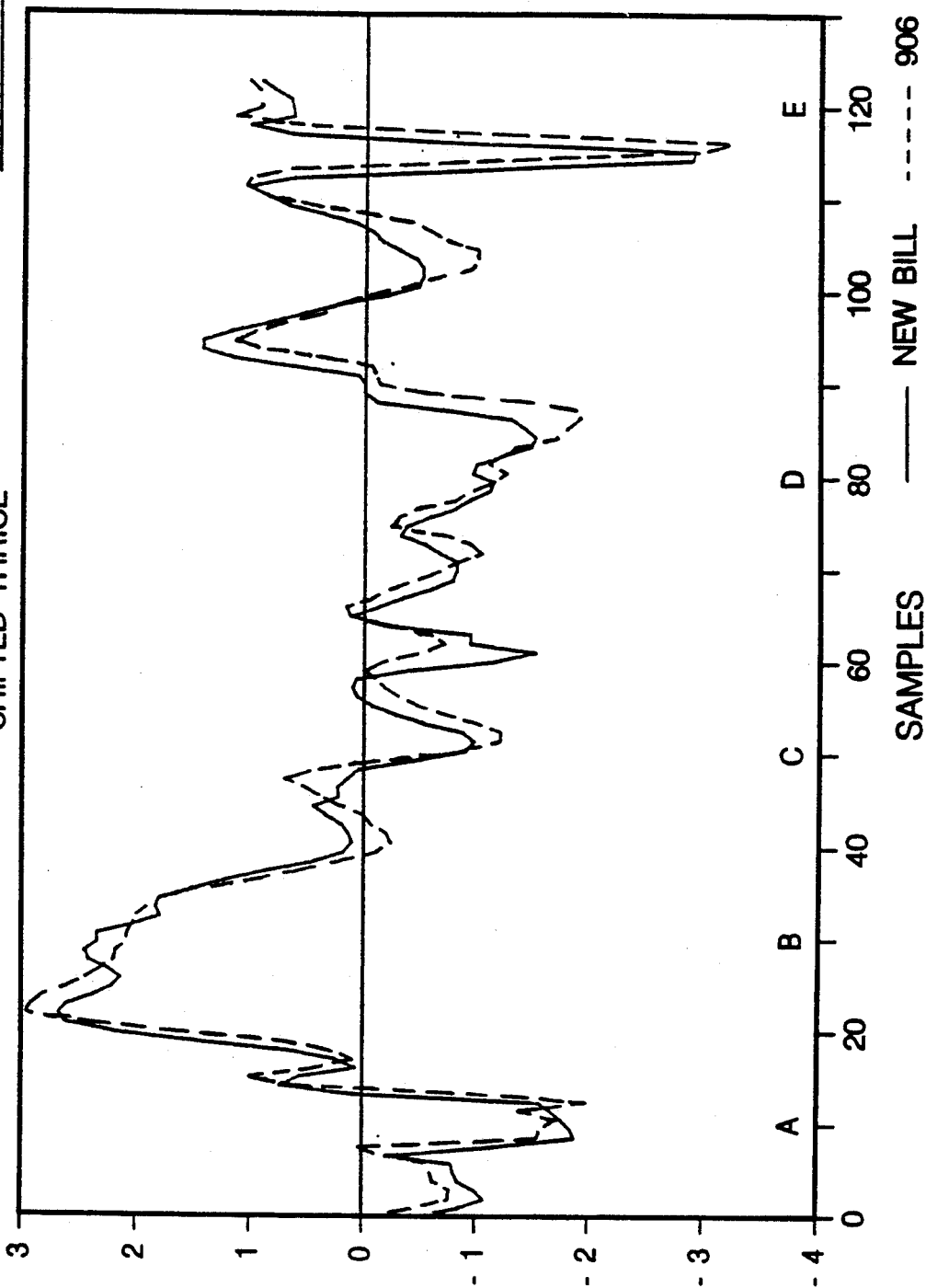

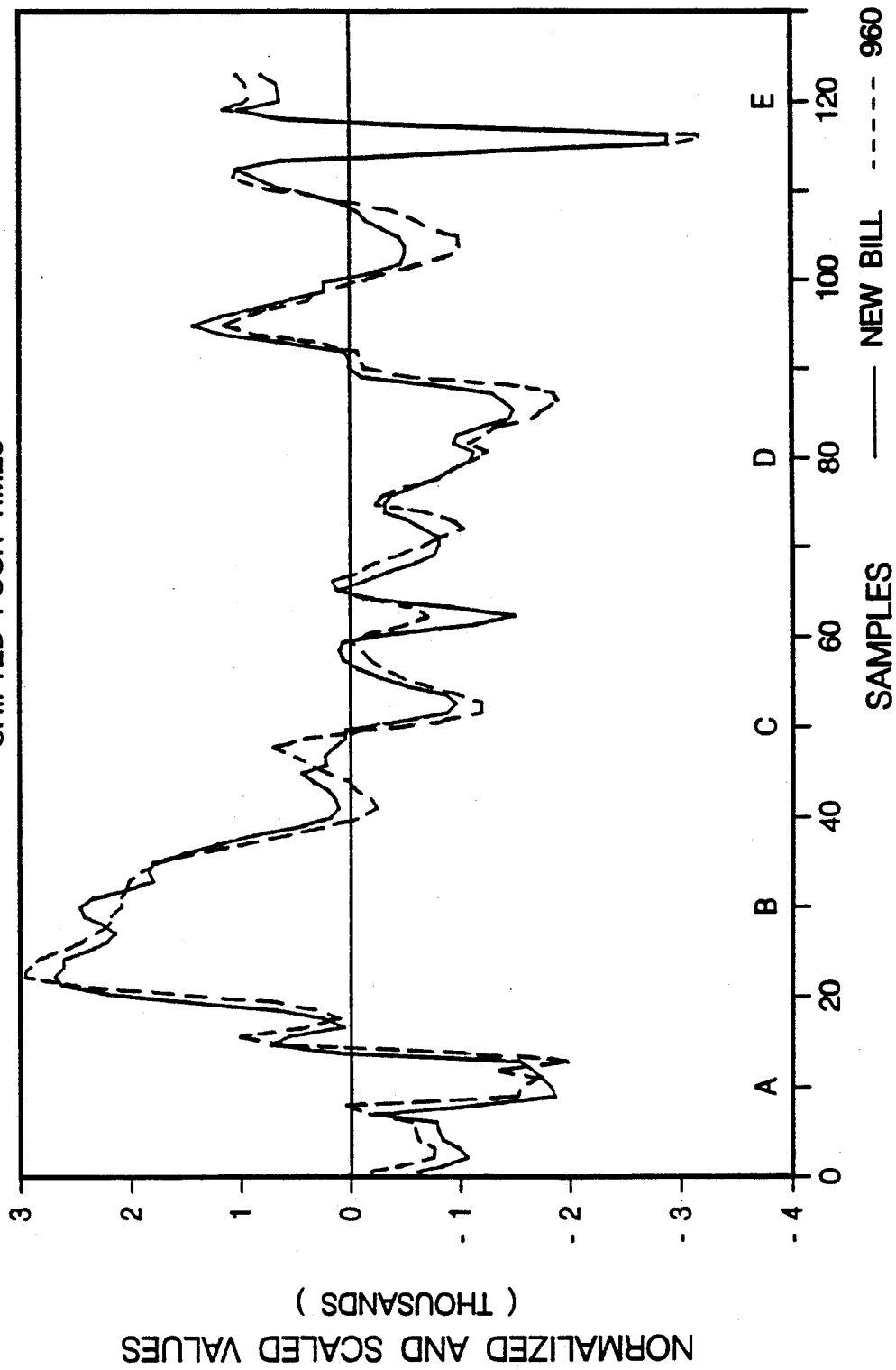

METHOD AND APPARATUS FOR CURRENCY DISCRIMINATION AND COUNTING

CROSS-REFERENCE TO RELATED APPLICATION

This application is a continuation-in-part of pending U.S. patent application Ser. No. 07/475,111, filed Feb. 5, 1990, now abandoned, for "Method and Apparatus for Currency Discrimination and Counting."

BACKGROUND OF THE INVENTION

1. Field of the Invention

The present invention relates, in general, to currency identification. The invention relates more particularly to a method and apparatus for automatic discrimination and counting of currency bills of different denominations using light reflectivity characteristics of indicia printed upon the currency bills.

2. Description of the Related Art

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating between different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. The more commonly used optical sensing technique, on the other hand, is based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination.

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

Most of the optical scanning systems available today utilize complex algorithms for obtaining a large number of reflectance data samples as a currency bill is scanned by an optical scanhead and for subsequently comparing the data to corresponding stored parameters to identify the bill denomination. Conventional systems require a relatively large number of optical samples per bill scan in order to sufficiently discriminate between currency denominations, particularly those denominations for which the reflectance patterns are not markedly distinguishable. The use of the large number of data samples slows down the rate at which incoming bills may be scanned and, more importantly, requires a correspondingly longer period of time to process the data in accordance with the discrimination algorithm.

A major problem associated with conventional systems is that, in order to obtain the required large number of reflectance samples required for accurate currency discrimination, such systems are restricted to scanning bills along the longer dimension of currency bills. Lengthwise scanning, in turn, has several inherent drawbacks including the need for an extended transport path for relaying the bill lengthwise across the scanhead and the added mechanical complexity involved in accommodating the extended path as well as the associated means for ensuring uniform, non-overlapping registration of bills with the sensing surface of the scanhead.

The end result is that systems capable of accurate currency discrimination are costly, mechanically bulky and complex, and generally incapable of both currency discrimination and counting at high speeds with a high degree of accuracy.

SUMMARY OF THE INVENTION

It is a principal object of the present invention to provide an improved method and apparatus for identifying and counting currency bills comprising a plurality of currency denominations.

It is another object of this invention to provide an improved method and apparatus of the above kind which is capable of efficiently discriminating among and counting bills of several currency denominations at a high speed and with a high degree of accuracy.

A related object of the present invention is to provide such an improved currency discrimination and counting apparatus which is compact, economical, and has uncomplicated construction and operation.

Briefly, in accordance with the present invention, the objectives enumerated above are achieved by means of an improved optical sensing and correlation technique adopted to both counting and denomination discrimination of currency bills. The technique is based on the optical sensing of bill reflectance characteristics obtained by illuminating and scanning a bill along its narrow dimension, approximately about the central section of the bill. Light reflected from the bill as it is optically scanned is detected and used as an analog representation of the variation in the dark and light content of the printed pattern or indicia on the bill surface.

A series of such detected reflectance signals are obtained by sampling and digitally processing, under microprocessor control, the reflected light at a plurality of predefined sample points as the bill is moved across the illuminated strip with its narrow dimension parallel to the direction of transport of the bill. Accordingly, a fixed number of reflectance samples is obtained across the narrow dimension of the note. The data samples obtained for a bill scan are subjected to digital processing, including a normalizing process to deaccentuate variations due to "contrast" fluctuations in the printed pattern or indicia existing on the surface of the bill being scanned. The normalized reflectance data represent a characteristic pattern that is fairly unique for a given bill denomination and incorporates sufficient distinguishing features between characteristic patterns for different currency denominations so as to accurately differentiate therebetween.

By using the above approach, a series of master characteristic patterns are generated and stored using standard bills for each denomination of currency that is to be detected. The "standard" bills used to generate the master characteristic patterns are preferably bills that are slightly used bills. According to a preferred embodiment, two characteristic patterns are generated and stored within system memory for each detectable currency denomination. The stored patterns correspond, respectively, to optical scans performed on the green surface of a bill along "forward" and "reverse" directions relative to the pattern printed on the bill. For bills which produce significant pattern changes when shifted slightly to the left or right, such as the $10 bill in U.S. currency, it is preferred to store two patterns for each of the "forward" and "reverse directions, each pair of patterns for the same direction represent two scan areas that are slightly displaced from each other along the long dimension of the bill. Preferably, the currency discrimination and counting method and apparatus of this invention is adapted to identify seven (7) different denominations of U.S. currency, i.e., $1, $2, $5, $10, $20, $50 and $100. Accordingly, a master set of 16 different characteristic patterns is stored within the system memory for subsequent correlation purposes (four patterns for the $10 bill and two patterns for each of the other denominations.

According to the correlation technique of this invention, the pattern generated by scanning a bill under test and processing the sampled data is compared with each of the 16 prestored characteristic patterns to generate, for each comparison, a correlation number representing the extent of similarity between corresponding ones of the plurality of data samples for the compared patterns. Denomination identification is based on designating the scanned bill as belonging to the denomination corresponding to the stored characteristic pattern for which the correlation number resulting from pattern comparison is determined to be the highest. The possibility of a scanned bill having its denomination mischaracterized following the comparison of characteristic patterns, is significantly reduced by defining a bi-level threshold of correlation that must be satisfied for a "positive" call to be made.

In essence, the present invention provides an improved optical sensing and correlation technique for positively identifying any of a plurality of different bill denominations regardless of whether the bill is scanned along the "forward" or "reverse" directions. The invention is particularly adapted to be implemented with a system programmed to track each identified currency denomination so as to conveniently present the aggregate total of bills that have been identified at the end of a scan run. Also in accordance with this invention, currency detecting and counting apparatus is disclosed which is particularly adapted for use with the novel sensing and correlation technique summarized above. The apparatus incorporates an abbreviated curved transport path for accepting currency bills that are to be counted and transporting the bills about their narrow dimension across a scanhead located downstream of the curved path and onto a conventional stacking station where sensed and counted bills are collected. The scanhead operates in conjunction with an optical encoder which is adapted to initiate the capture of a predefined number of reflectance data samples when a bill (and, thus, the indicia or pattern printed thereupon) moves across a coherent strip of light focused downwardly of the scanhead.

The scanhead uses a pair of light-emitting diodes ("LED"s) to focus a coherent light strip of predefined dimensions and having a normalized distribution of light intensity across the illuminated area. The LED's are angularly disposed and focus the desired strip of light onto the narrow dimension of a bill positioned flat across the scanning surface of the scanhead. A photo detector detects light reflected from the bill. The photo detector is controlled by the optical encoder to obtain the desired reflectance samples.

Initiation of sampling is based upon detection of the change in reflectance value that occurs when the outer border of the printed pattern on a bill is encountered relative to the reflectance value obtained at the edge of the bill where no printed pattern exist. According to a preferred embodiment of this invention, illuminated strips of at least two different dimensions are used for the scanning process. A narrow strip is used initially to detect the starting point of the printed pattern on a bill and is adapted to distinguish the thin borderline that typically marks the starting point of and encloses the printed pattern on a bill. For the rest of the narrow dimension scanning following detection of the border line of the printed pattern, a substantially wider strip of light is used to collect the predefined number of samples for a bill scan the generation and storage of characteristic patterns using standard notes and the subsequent comparison and correlation procedure for classifying the scanned bill as belonging to one of several predefined currency denominations is based on the above-described sensing and correlation technique.

BRIEF DESCRIPTION OF THE DRAWINGS

Other objects and advantages of the invention will become apparent upon reading the following detailed description in conjunction with the drawings in which:

FIG. 1 is a functional block diagram illustrating the conceptual basis for the optical sensing and correlation method and apparatus, according to the system of this invention;

FIGS. 10A-E are graphical illustrations of the effect produced on correlation pattern by using the progressive shifting technique, according to an embodiment of this invention;

Figure 1A:
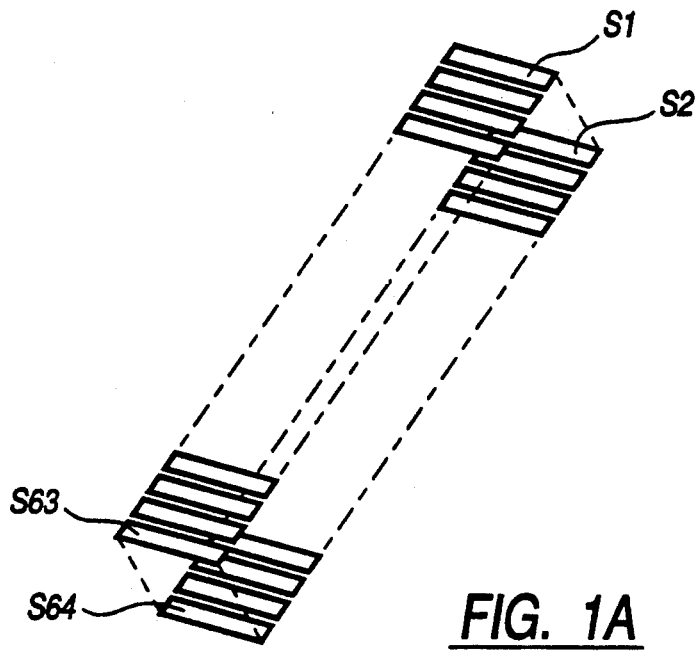
FIG. 1A is a diagrammatic perspective illustration of the successive areas scanned during the traversing movement of a single bill across the scanhead.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a functional block diagram illustrating the optical sensing and correlation system according to this invention. The system 10 includes a bill accepting station 12 where stacks of currency bills that need to be identified and counted are positioned. Accepted bills are acted upon by a bill separating station 14 which functions to pick out or separate one bill at a time for being sequentially relayed by a bill transport mechanism 16, according to a precisely predetermined transport path, across an optical scanhead 18 where the currency denomination of the bill is scanned, identified and counted at a rate in excess of 800 bills per minute. The scanned bill is then transported to a bill stacking station 20 where bills so processed are stacked for subsequent removal.

The optical scanhead 18 comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly below the strip. The analog output of photodetector 26 is converted into a digital signal by means of an analog-to-digital (ADC) convertor unit 28 whose output is fed as a digital input to a central processing unit (CPU) 30.

According to a feature of this invention, the bill transport path is defined in such a way that the transport mechanism 16 moves currency bills with the narrow dimension "W" of the bills being parallel to the transport path and the scan direction. Thus, as a bill 17 moves on the transport path on the scanhead 18, the coherent light strip 24 effectively scans the bill across the narrow dimension "W" of the bill. Preferably, the transport path is so arranged that a currency bill 17 is scanned approximately about the central section of the bill along its narrow dimension, as best shown in FIG. 1. The scanhead 18 functions to detect light reflected from the bill as it moves across the illuminated light strip 24 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system of this invention is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features between characteristic patterns for different currency denominations, as will be explained in detail below.

In order to ensure strict correspondence between reflectance samples obtained by narrow dimension scanning of successive bills, the initiation of the reflectance sampling process is preferably controlled through the CPU 30 by means of an optical encoder 32 which is linked to the bill transport mechanism 16 and precisely tracks the physical movement of the bill 17 across the scanhead 18. More specifically, the optical encoder 32 is linked to the rotary motion of the drive motor which generates the movement imparted to the bill as it is relayed along the transport path. In addition, it is ensured that positive contact is maintained between the bill and the transport path, particularly when the bill is being scanned by the scanhead 18. Under these conditions, the optical encoder is capable of precisely tracking the movement of the bill relative to the light strip generated by the scanhead by monitoring the rotary motion of the drive motor.

The output of photodetector 26 is monitored by the CPU 30 to initially detect the presence of the bill underneath the scanhead and, subsequently, to detect the starting point of the printed pattern on the bill, as represented by the thin borderline 17B which typically encloses the printed indicia on currency bills. Once the borderline 17B has been detected, the optical encoder is used to control the timing and number of reflectance samples that are obtained from the output of the photodetector 26 as the bill 17 moves across the scanhead 18 and is scanned along its narrow dimension.

The detection of the borderline constitutes an important step and realizes improved discrimination efficiency since the borderline serves as an absolute reference point for initiation of sampling. If the edge of a bill were to be used as a reference point, relative displacement of sampling points can occur because of the random manner in which the distance from the edge to the borderline varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder for controlling the sampling process relative to the physical movement of a bill across the scanhead is also advantageous in that the encoder can be used to provide a predetermined delay following detection of the borderline prior to initiation of samples. The encoder delay can be adjusted in such a way that the bill is scanned only across those segments along its narrow dimension which contain the most distinguishable printed indicia relative to the different currency denominations.

In the case of U.S. currency, for instance, it has been determined that the central, approximately two-inch portion of currency bills, as scanned across the central section of the narrow dimension of the bill, provides sufficient data for distinguishing among the various U.S. currency denominations on the basis of the correlation technique used in this invention. Accordingly, the optical encoder can be used to control the scanning process so that reflectance samples are taken for a set period of time and only after a certain period of time has elapsed since the borderline has been detected, thereby restricting the scanning to the desired central portion of the narrow dimension of the bill.

Figure 1B:
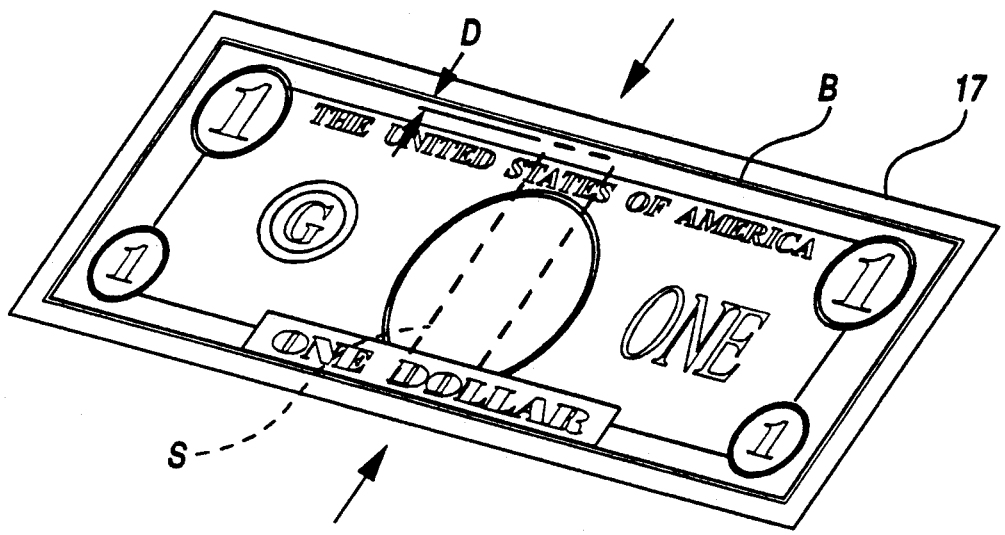
FIG. 1B is a perspective view of a bill and the preferred area to be scanned on the bill.
Figure 1C:
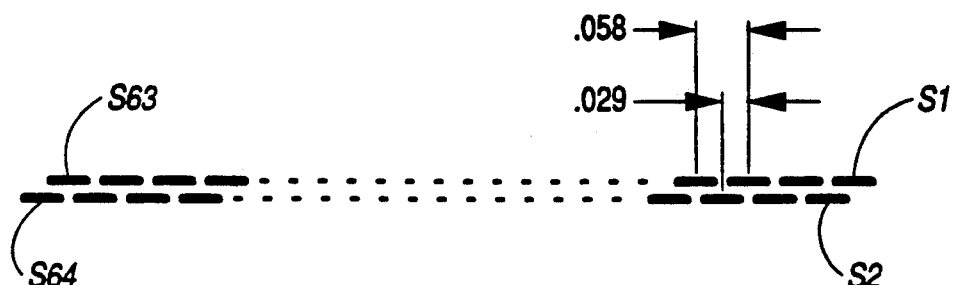
FIG. 1C is a diagrammatic side elevation of the scan areas illustrated in FIG. 1A, to show the overlapping relationship of those areas.

FIGS. 1A–1C illustrate the scanning process in more detail. As a bill is advanced in a direction parallel to the narrow edges of the bill, scanning via the wide slit in the scanhead is effected along a segment S of the central portion of the bill. This segment S begins a fixed distance d inboard of the border line B. As the bill traverses the scan head, a strip s of the segment S is always illuminated, and the photodetector produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

As illustrated in FIGS. 1A and 1C, it is preferred that the sampling intervals be selected so that the strips s that are illuminated for successive samples overlap one another. The odd-numbered and even-numbered sample strips have been separated in FIGS. 1A and 1C to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along a segment S that is 1.83 inch long (64 samples).

The optical sensing and correlation technique is based upon using the above process to generate a series of master characteristic patterns using standard bills for each denomination of currency that is to be detected. According to a preferred embodiment, two or four characteristic patterns are generated and stored within system memory, preferably in the form of an EPROM 34 (see FIG. 1), for each detectable currency denomination. The characteristic patterns for each bill are generated from optical scans, performed on the green surface of the bill and taken along both the "forward" and "reverse" directions relative to the pattern printed on the bill.

In adapting this technique to U.S. currency, for example, characteristic patterns are generated and stored for seven different denominations of U.S. currency, i.e., $1, $2, $5, $10, $20, $50, and $100. As explained previously, four characteristic patterns are generated for the $10 bill, and two characteristic patterns are generated for each of the other denominations. Accordingly, a master set of 16 different characteristic patterns is stored within the system memory for subsequent correlation purposes. Once the master characteristic patterns have been stored, the pattern generated by scanning a bill under test is compared by the CPU 30 with each of the 16 pre-stored master characteristic patterns to generate, for each comparison, a correlation number representing the extent of correlation, i.e., similarity between corresponding ones of the plurality of data samples, for the patterns being compared.

The CPU 30 is programmed to identify the denomination of the scanned bill as corresponding to the stored characteristic pattern for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call, as will be explained in detail below.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Figure 2:
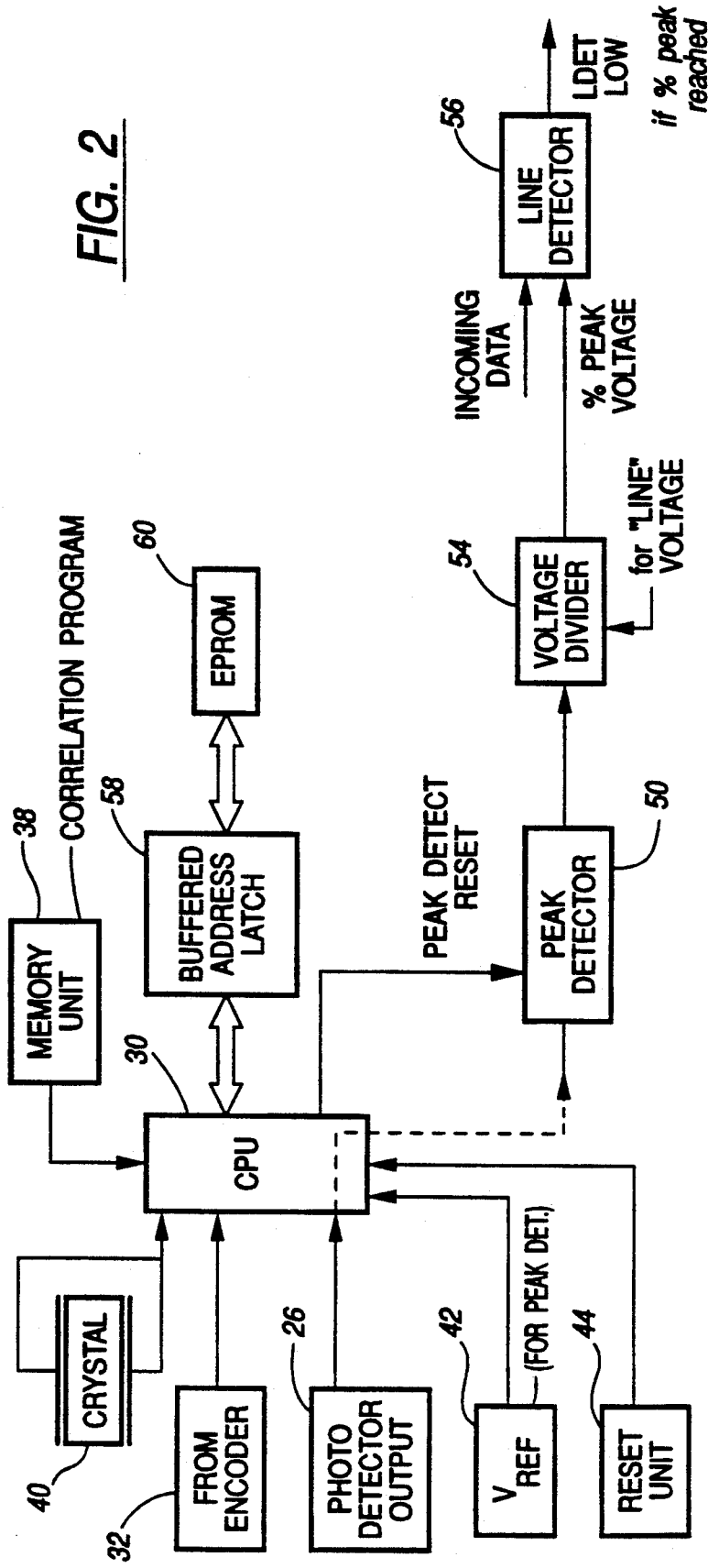
FIGS. 2-2A are block diagrams illustrating a preferred circuit arrangement for processing and correlating reflectance data according to the optical sensing and counting technique of this invention.

Referring now to FIG. 2, there is shown a representation, in block diagram form, of a preferred circuit arrangement for processing and correlating reflectance data according to the system of this invention. As shown therein, the CPU 30 accepts and processes a variety of input signals including those from the optical encoder 32, the photodetector 26 and a memory unit 38, which can be an erasable programmable read only memory (EPROM). The memory unit 38 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ on the basis of which peak detection of sensed reflectance data is performed, as explained in detail below.

Figure 2A:
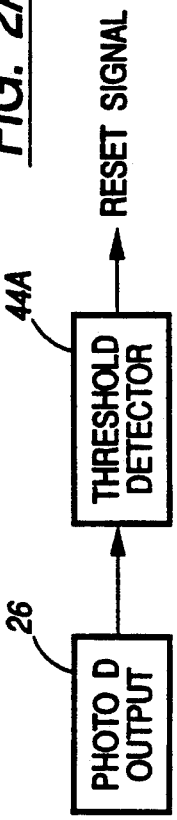

The CPU 30 also accepts a timer reset signal from a reset unit 44 which, as shown in FIG. 2A, accepts the output voltage from the photodetector 26 and compares it, by means of a threshold detector 44A, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 1) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24. When this occurs, the reset unit 44 provides a "high" signal to the CPU 30 and marks the initiation of the scanning procedure.

In accordance with a feature of this invention, the machine-direction dimension of the illuminated strip of light produced by the light sources within the scanhead is set to be relatively small for the initial stage of the scan when the thin borderline is being detected. The use of the narrow slit increases the sensitivity with which the reflected light is detected and allows minute variations in the "gray" level reflected off the bill surface to be sensed. This is important in ensuring that the thin borderline of the pattern, i.e., the starting point of the printed pattern on the bill, is accurately detected. Once the borderline has been detected, subsequent reflectance sampling is performed on the basis of a relatively wider light strip in order to completely scan across the narrow dimension of the bill and obtain the desired number of samples, at a rapid rate. The use of a wider slit for the actual sampling also smooths out the output characteristics of the photodetector and realizes the relatively large magnitude of analog voltage which is essential for accurate representation and processing of the detected reflectance values.

Returning to FIG. 2, the CPU 30 processes the output of photodetector 26 through a peak detector 50 which essentially functions to sample the photodetector output voltage and hold the highest, i.e., peak, voltage value encountered after the detector has been enabled. The peak detector is also adapted to define a scaled voltage on the basis of which the pattern borderline on bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_S$ is set to be about 70-80 percent of the peak voltage.

The scaled voltage $V_S$ is supplied to a line detector 56 which is also provided with the incoming instantaneous output of the photodetector 26. The line detector 56 compares the two voltages at its input side and generates a signal $L_{DET}$ which normally stays "low" and goes "high" when the edge of the bill is scanned. The signal $L_{DET}$ goes "low" when the incoming photodetector output reaches the pre-defined percentage of the peak photodetector output up to that point, as represented by the voltage $V_S$. Thus, when the signal $L_{DET}$ goes "low", it is an indication that the borderline of the bill pattern has been detected. At this point, the CPU 30 initiates the actual reflectance sampling under control of the encoder 32 (see FIG. 2) and the desired fixed number of reflectance samples are obtained as the currency bill moves across the illuminated light strip and is scanned along the central section of its narrow dimension.

When master characteristic patterns are being generated, the reflectance samples resulting from the scanning of a standard bill are loaded into corresponding designated sections within a system memory 60, which is preferably an EPROM. The loading of samples is accomplished through a buffered address latch 58, if necessary. Preferably, master patterns are generated by scanning a standard bill a plurality of times, typically three (3) times, and obtaining the average of corresponding data samples before storing the average as representing a master pattern. During currency discrimination, the reflectance values resulting from the scanning of a test bill are sequentially compared, under control of the correlation program stored within the memory unit 38, with each of the corresponding characteristic patterns stored within the EPROM 60, again through the address latch 58.

Figure 3:
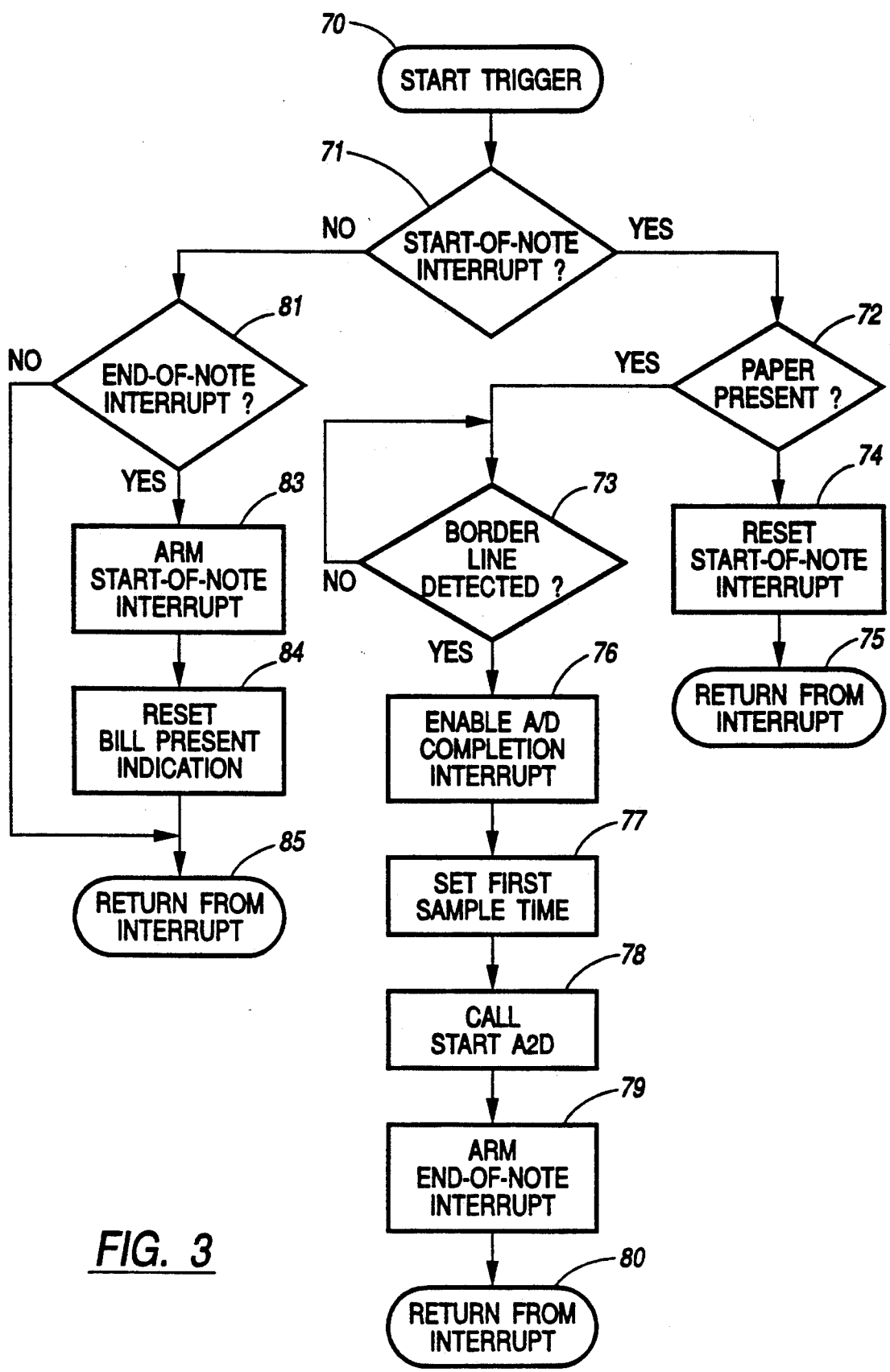
FIGS. 3-8A are flow charts illustrating the sequence of operations involved in implementing the optical sensing and correlation technique.

Referring now to FIGS. 3-7, there are shown flow charts illustrating the sequence of operations involved in implementing the above-described optical sensing and correlation technique of this invention. FIG. 3, in particular, illustrates the sequence involved in detecting the presence of a bill under the scanhead and the borderline on the bill. This section of the system program, designated as "TRIGGER", is initiated at step 70. At step 71 a determination is made as to whether or not a start-of-note interrupt, which signifies that the system is ready to search for the presence of a bill, is set, i.e., has occurred. If the answer at step 71 is found to be positive, step 72 is reached where the presence of the bill adjacent the scanhead is ascertained on the basis of the reset procedure described above in connection with the reset unit 44 of FIG. 2.

If the answer at step 72 is found to be positive, i.e., a bill is found to be present, step 73 is reached where a test is performed to see if the borderline has been detected on the basis of the reduction in peak value to a predefined percentage thereof, which, as described above, is indicated by the signal $L_{DET}$ going "low." If the answer at step 73 is found to be negative, the program continues to loop until the borderline has been detected. If the answer at step 72 is found to be negative, i.e., no bill is found to be present, the start-of-note interrupt is reset at step 74 and the program returns from interrupt at step 75.

If the borderline is found to have been detected at step 73, step 76 is accessed where an A/D completion interrupt is enabled, thereby signifying that the analog-to-digital conversion can subsequently be performed at desired time intervals. Next, at step 77, the time when the first reflectance sample is to be obtained is defined, in conjunction with the output of the optical encoder. At step 78 the capture and digitization of the detected reflectance samples is undertaken by recalling a routine designated as "STARTA2D" which will be described in detail below. At the completion of the digitization process, an end-of-note interrupt must occur, which resets the system for sensing the presence of the following bill to be scanned, which is enabled at step 79. Subsequently, at step 80 the program returns from interrupt.

If the start-of-note interrupt is not found to have occurred at step 71, a determination is made at step 81 to see if the end-of-note interrupt has occurred. If the answer at 81 is negative, the program returns from interrupt at step 85. If a positive answer is obtained at 81, step 83 is accessed where the start-of-note interrupt is activated and, at step 84, the reset unit, which monitors the presence of a bill, is reset to be ready for determining the presence of bills. Subsequently, the program returns from interrupt at step 85.

Figures 4A, 4B:
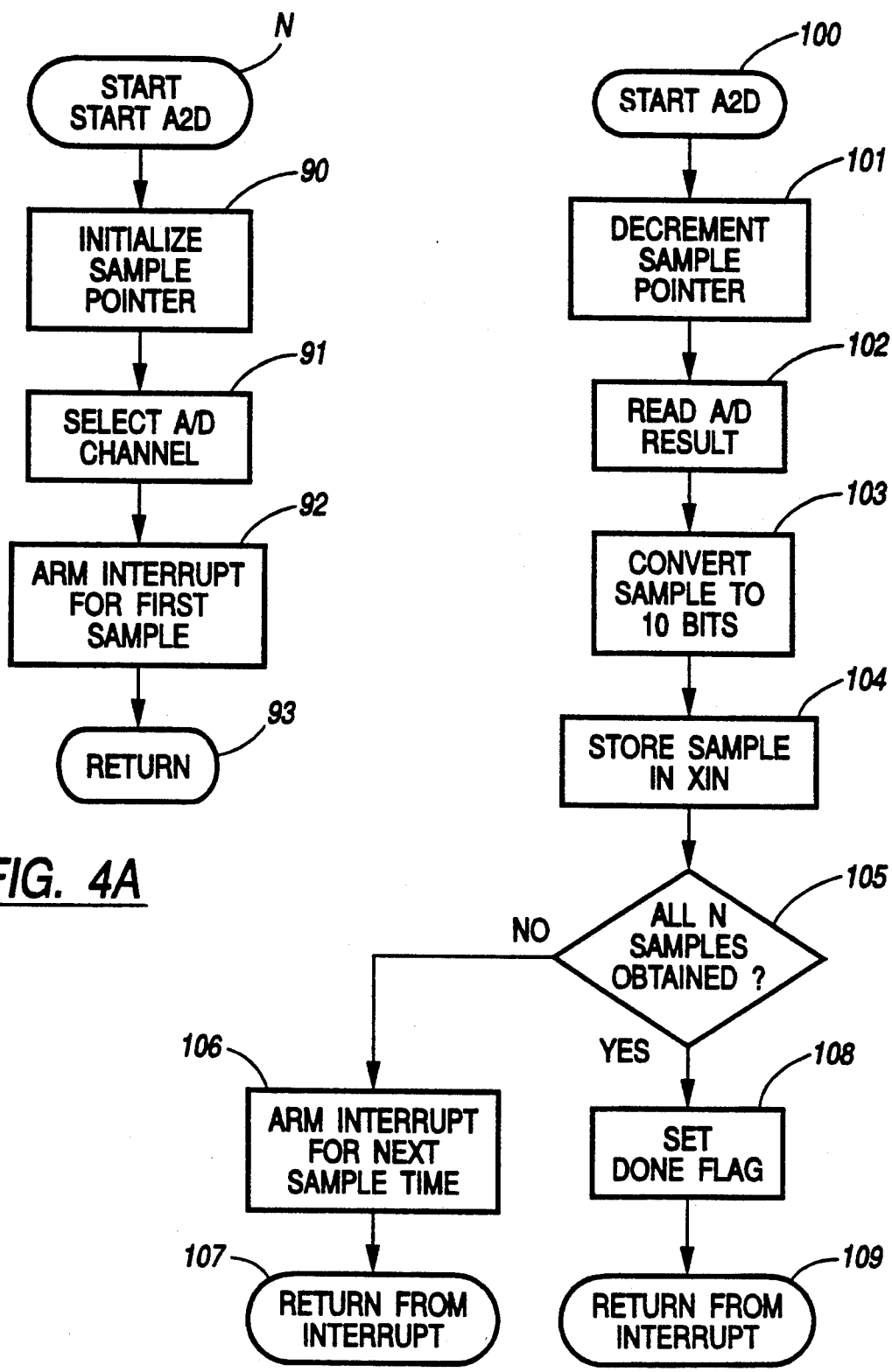

Referring now to FIGS. 4A and 4B there are shown, respectively, routines for starting the STARTA2D routine and the digitizating routine itself. In FIG. 4A, the initiation of the STARTA2D routine at step 90 causes the sample pointer, which provides an indication of the sample being obtained and digitized at a given time, to be initialized. Subsequently, at step 91, the particular channel on which the analog-to-digital conversion is to be performed is enabled. The interrupt authorizing the digitization of the first sample is enabled at step 92 and the main program accessed again at step 93.

FIG. 4B is a flow chart illustrating the sequential procedure involved in the analog-to-digital conversion routine, which is designated as "A2D". The routine is started at step 100. Next, the sample pointer is decremented at step 101 so as to maintain an indication of the number of samples remaining to be obtained. At step 102, the digital data corresponding to the output of the photodetector for the current sample is read. The data is converted to its final form at step 103 and stored within a pre-defined memory segment as $X_{IN}$.

Next, at step 105, a check is made to see if the desired fixed number of samples "N" has been taken. If the answer is found to be negative, step 106 is accessed where the interrupt authorizing the digitization of the succeeding sample is enabled and the program returns from interrupt at step 107 for completing the rest of the digitizing process. However, if the answer at step 105 is found to be positive, i.e., the desired number of samples have already been obtained, a flag indicating the same is set at step 108 and the program returns from interrupt at step 109.

Figure 5:
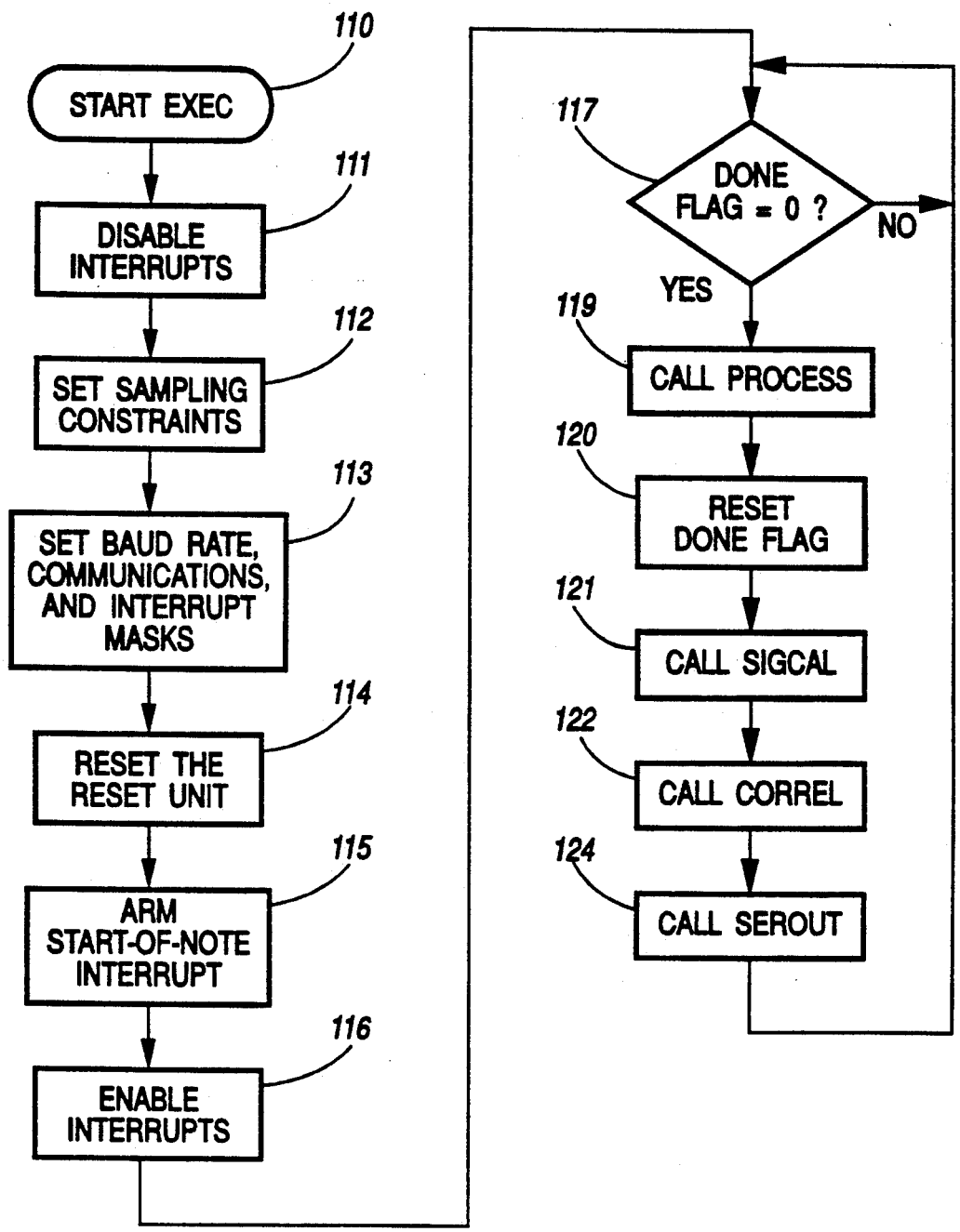
Figure 6:
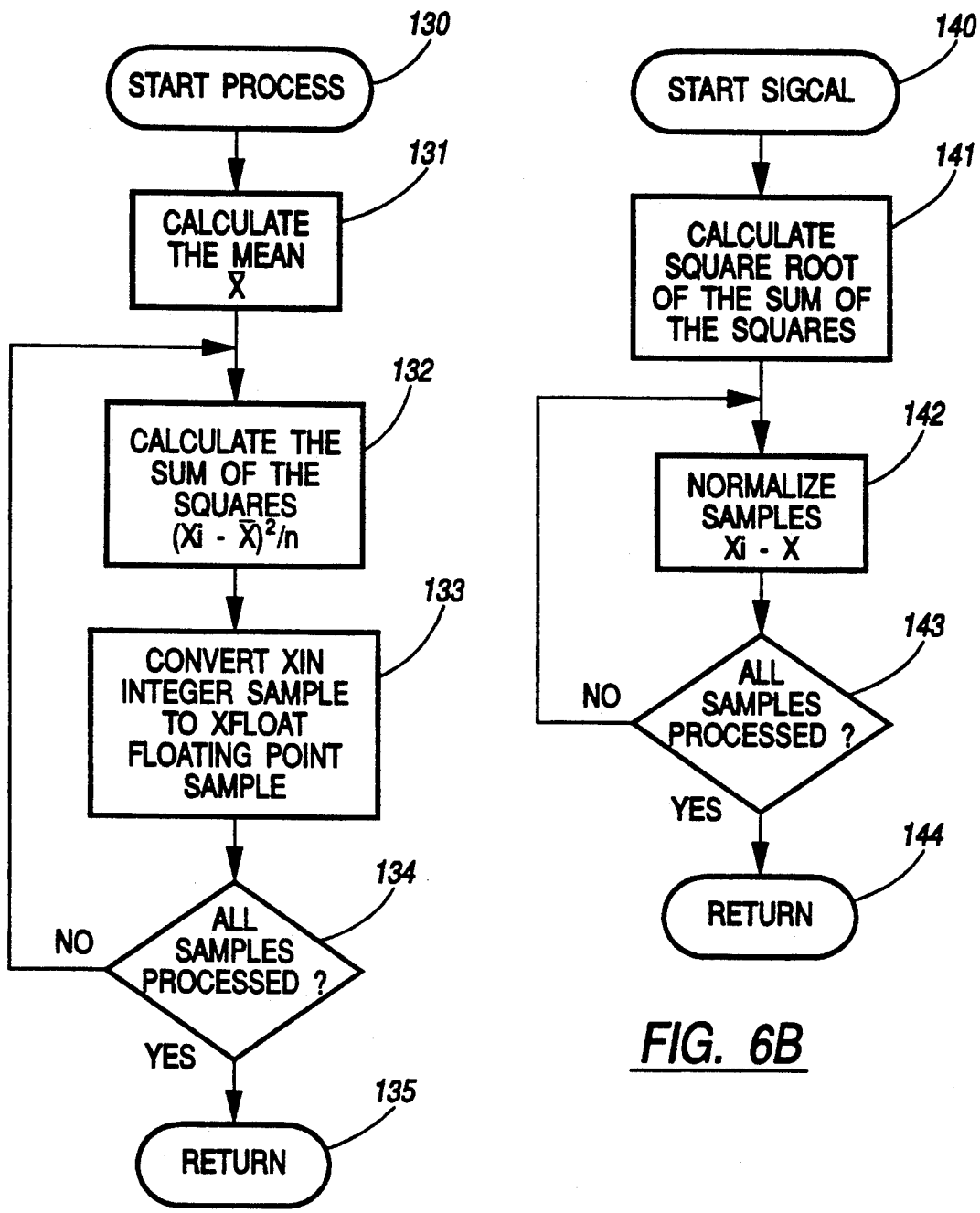

Referring now to FIG. 5, there is shown the sequential procedure involved in executing the routine, designated as "EXEC", which performs the mathematical steps involved in the correlation process. The routine is started at step 110. At step 111, all interrupts are disabled while CPU initialization occurs. At step 112, any constants associated with the sampling process are set and, at step 113, communications protocols, if any, for exchange of processed data and associated results, bad rates, interrupt masks, etc. are defined.

At step 114, the reset unit indicating the presence of a bill is reset for detecting the presence of the first bill to be scanned. At step 115, the start-of-note interrupt is enabled to put the system on the look out for the first incoming bill. Subsequently, at step 116, all other related interrupts are also enabled since, at this point, the initialization process has been completed and the system is ready to begin scanning bills. A check is made at step 117 to see if, in fact, all the desired number of samples have been obtained. If the answer at step 117 is found to be negative the program loops until a positive answer is obtained.

In accordance with this invention, a simple correlation procedure is utilized for processing digitized reflectance values into a form which is conveniently and accurately compared to corresponding values pre-stored in an identical format. More specifically, as a first step, the mean value $\overline{X}$ for the set of digitized reflectance samples (comparing "n" samples) obtained for a bill scan run is first obtained as below:

$$X = \sum_{i=0}^{n} \frac{X_i}{n} \tag{1}$$

Subsequently, a normalizing factor Sigma "$\sigma$" is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n} \tag{2}$$

In the final step, each reflectance sample is normalized by obtaining the difference between the sample and the above-calculated mean value and dividing it by the square root of the normalizing factor Sigma "$\sigma$" as defined by the following equation:

$$X_n = \frac{X_i - \overline{X}}{(\sigma)^{\frac{1}{2}}} \tag{3}$$

The result of using the above correlation equations is that, subsequent to the normalizing process, a relationship of correlation exists between a test pattern and a master pattern such that the aggregate sum of the products of corresponding samples in a test pattern and any master pattern, when divided by the total number of samples, equals unity if the patterns are identical. Otherwise, a value less than unity is obtained. Accordingly, the correlation number or factor resulting from the comparison of normalized samples within a test pattern to those of a stored master pattern provides a clear indication of the degree of similarity or correlation between the two patterns.

According to a preferred embodiment of this invention, the fixed number of reflectance samples which are digitzed and normalized for a bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In a preferred embodiment, for instance, the factor of unity which results when a hundred percent correlation exists is represented in terms of the binary number $2^{10}$, which is equal to a decimal value of 1024. Using the above procedure, the normalized samples within a test pattern are compared to each of the 16 master characteristic patterns stored within the system memory in order to determine the particular stored pattern to which the test pattern corresponds most closely by identifying the comparison which yields a correlation number closest to 1024.

According to a feature of this invention, a bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satified by these two correlation numbers. It has experimentally been found that a correlation number of about 850 serves a as a good cut-off threshold above which positive calls may be made with a high degree of confidence and below which the designation of a test pattern as corresponding to any of the stored patterns is uncertain. As a second thresholding level, a minimum separation is prescribed between the two highest correlation numbers before making a call. This ensures that a positve call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no call is made.

Returning now to FIG. 5, the correlation procedure is initiated at step 119 where a routine designated as "PROCESS" is accessed. The procedure involved in executing this routine is illustrated at FIG. 6A which shows the routine starting at step 130. At step 131, the mean $\overline{X}$ is calculated in accordance on the basis of Equation (1). At step 132 the sum of the squares is calculated in accordance with Equation (2). At step 133, the digitized values of the reflectance samples, as represented in integer format XIN, are converted to floating point format XFLOAT for further processing. At step 134, a check is made to see if all samples have been processed and if the answer is found to be positive, the routine ends at step 135 and the main program is accessed again. If the answer at step 134 is found to be negative, the routine returns to step 132 where the above calculations are repeated.

At the end of the routine PROCESS, the program returns to the routine EXEC at step 120 where the flag indicating that all digitized reflectance samples have been processed is reset. Subsequently, at step 121, a routine designated as "SIGCAL" is accessed. The procedure involved in executing this routine is illustrated at FIG. 6B which shows the routine starting at step 140. At step 141, the square root of the sum of the squares, as calculated by the routine PROCESS, is calculated in accordance with Equation (2). At step 142, the floating point values calculated by the routine PROCESS are normalized in accordance with Equation (3) using the calculated values at step 141. At step 143, a check is made to see if all digital samples have been processed. If the answer at step 143 is found to be negative, the program returns to step 142 and the conversion is continued until all samples have been processed. At that point, the answer at step 143 is positive and the routine returns to the main program at step 144.

Figure 7:
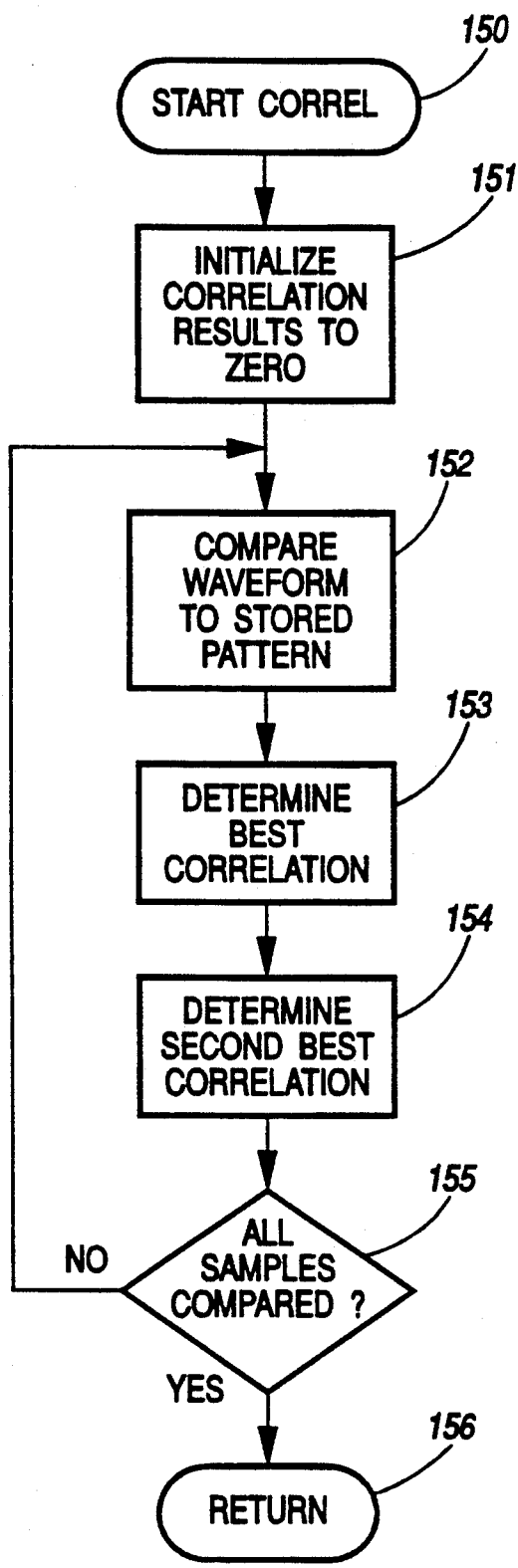

Returning to the flow chart of FIG. 5, the next step to be executed is step 122 where a routine designated as "CORREL" is accessed. The procedure involved in executing this routine is illustrated at FIG. 7 which shows the routine starting at 150. At step 151, correlation results are initialized to zero and, at step 152, the test pattern is compared to the first one of the stored master patterns. At step 153, the first call corresponding to the highest correlation number obtained up to that point is determined. At step 154, the second call corresponding to the second highest correlation number obtained up to that point is determined. At step 155, a check is made to see if the test pattern has been compared to all master patterns. If the answer is found to be negative, the routine reverts to step 152 where the comparison procedure is reiterated. When all master patterns have been compared to the test pattern, step 155 yields a positive result and the routine returns to the main program at step 156.

Figure 8:
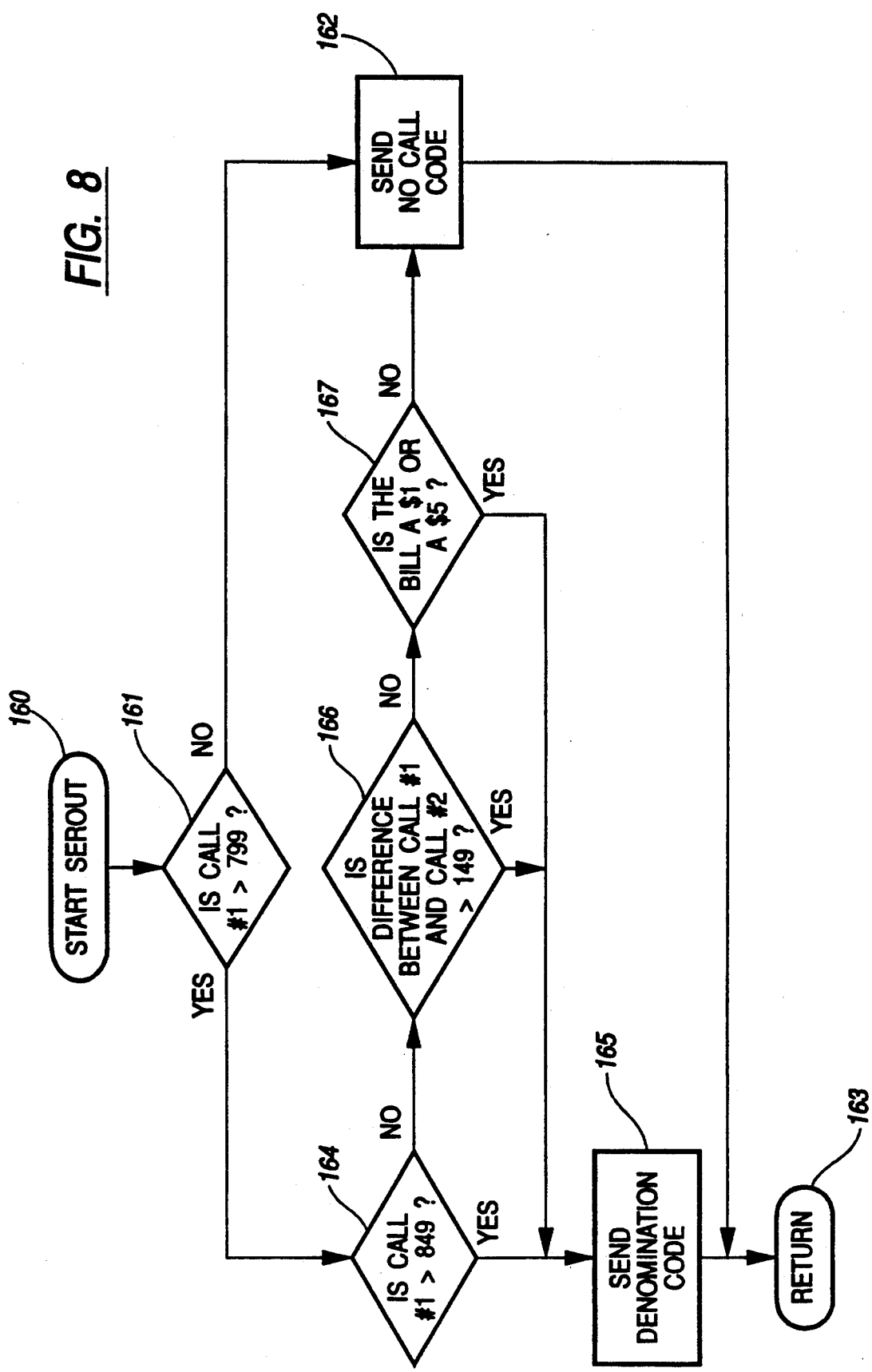

Returning again to FIG. 5, step 124 is accessed where a routine designated as "SEROUT" is initiated. The procedure involved in executing the routine SEROUT is illustrated at FIG. 8 which shows the routine as starting at step 160. Step 161 determines whether the correlation number is greater than 799. If the answer is negative, the correlation number is too low to identify the denomination of the bill with certainty, and thus step 162 generates a "no call" code and returns to the main program at step 163.

An affirmative answer at step 161 advances the system to step 164, which determines whether the correlation number is greater than 849. An affirmative answer at step 164 indicates that the correlation number is sufficiently high that the denomination of the scanned bill can be identified with certainty without any further checking. Consequently, a "denomination" code identifying the denomination represented by the stored pattern resulting in the highest correlation number is generated at step 165, and the system returns to the main program at step 163.

A negative answer at step 164 indicates that the correlation number is between 800 and 850. It has been found that correlation numbers within this range are sufficient to identify $1 and $5 bills, but not other denominations of bills. Accordingly, a negative response at step 164 advances the system to step 166 which determines whether the difference between the two highest correlation numbers is greater than 149. If the answer is affirmative, the denomination identified by the highest correlation number is acceptable, and thus the "denomination" code is generated at step 165.

If the difference between the two highest correlation numbers is less than 150, step 166 produces a negative response which advances the system to step 167 to determine whether the highest correlation number identified the bill as either a $1-bill or a $5-bill. If the answer is affirmative, the highest correlation number is acceptable as identifying the bill denomination, and thus the "denomination" code is generated at step 165. A negative response at step 167 indicates that the bill was not identified as a $1-bill or a $5-bill by the highest correlation number, the difference between the two highest correlation numbers was less than 150, and the highest correlation number was less then 850. This combination of conditions indicates that a positive call cannot be made with a high degree of confidence, and thus the "no call" code is generated at step 162.

One problem encountered in currency recognition and counting systems of the above-described kind is the difficulty involved in interrupting (for a variety of reasons) and resuming the scanning and counting procedure as a stack of bills is being scanned. If a particular currency recognition unit (CRU) has to be halted in operation due to a "major" system error, such as a bill being jammed along the transport path, there is generally no concern about the outstanding transitional status of the overall recognition and counting process. However, where the CRU has to be halted due to a "minor" error, such as the identification of a scanned bill as being a counterfeit (based on a variety of monitored parameters which are not pertinent to the present disclosure) or a "no call" (a bill which is not identifiable as belonging to a specific currency denomination based on the plurality of stored master patterns and/or other criteria), it is desirable that the transitional status of the overall recognition and counting process be retained so that the CRU may be restarted without any effective disruptions of the recognition/counting process.

More specifically, once a scanned bill has been identified as a "no call" bill ($B_1$) based on some set of predefined criteria, it is desirable that this bill $B_1$ be transported directly to the system stacker and the CRU brought to a halt with bill $B_1$ remaining at the top-most stacker position while, at the same time, ensuring that the following bills are maintained in positions along the bill transport path whereby CRU operation can be conveniently resumed without any disruption of the recognition/counting process.

Since the bill processing speeds at which currency recognition systems must operate are substantially high (speeds of the order of about 1000 bills per minute are desirable), it is practically impossible to totally halt the system following a "no call" without the following bill $B_2$ already being transported under the optical scanhead and partially scanned. As a result, it is virtually impossible for the CRU system to retain the transitional status of the recognition/counting process (particularly with respect to bill $B_2$) in order that the process may be resumed once the bad bill $B_1$ has been transported to the stacker, conveniently removed therefrom, and the system restarted. The basic problem is that if the CRU is halted with bill $B_2$ only partially scanned, there is no possibility of referencing the data reflectance samples extracted therefrom in such a way that the scanning may be later continued (when the CRU is restarted) from exactly the same point where the sample extraction process was interrupted when the CRU was stopped.

Even if an attempt were made at immediately halting the CRU system following a "no call," any subsequent scanning of bills would be totally unreliable because of mechanical backlash effects and the resultant disruption of the optical encoder routine used for bill scanning. Consequently, when the CRU is restarted, the call for the following bill is also likely to be bad and the overall recognition/counting process is totally disrupted as a result of an endless loop of "no calls."

According to an important feature of the present invention, the above problems are solved by an improved currency detecting and counting technique whereby a scanned bill identified as a "no call" is transported directly to the top of the system stacker and the CRU is halted without adversely affecting the data collection and processing steps for a succeeding bill. Accordingly, when the CRU is restarted, the overall bill recognition and counting procedure can be resumed without any disruption as if the CRU had never been halted at all.

According to the improved currency detecting/counting technique, the CRU is operated in the normal fashion described above in detail, whereby an incoming bill is scanned and processed in order to make a call as to the bill denomination. If the bill is identified as a "no call" based on any of a variety of conventionally defined bill criteria (such as the criteria in FIG. 8), the CRU is subjected to a controlled deceleration process whereby the CRU operating speed, i.e., the speed at which test bills are moved across the system scanhead along the bill transport path, is reduced from its normal operating level. During this deceleration process the "no call" bill ($B_1$) is transported to the top of the stacker and, at the same time, the following bill $B_2$ is subjected to the standard scan and processing procedure in order to identify the denomination thereof.

The rate of deceleration is such that optical scanning of bill $B_2$ is completed by the time the CRU operating speed is reduced to a predefined operating speed. While the exact operating speed at the end of the scanning of bill $B_2$ is not critical, the objective is to permit complete scanning of bill $B_2$ without subjecting it to backlash effects that would result if the ramping were too fast while, at the same time, ensuring that the bill $B_1$ has in fact been transported to the stacker in the meantime.

It has experimentally been determined that at nominal operating speeds of the order of 1000 bills per minute, the deceleration is preferably such that the CRU operating speed is reduced to about one-third of its normal operating speed at the end of the deceleration phase, i.e., by the time optical scanning of bill $B_2$ has been completed. It has been determined that at these speed levels, positive calls can be made as to the denomination of bill $B_2$ based on reflectance samples gathered during the deceleration phase with a relatively high degree of certainty (i.e., with a correlation number exceeding about 850.)

Once the optical scanning of bill $B_2$ has been completed, the speed is reduced to an even slower speed until the bill $B_2$ has passed bill-edge sensors S1 and S2 described below whereby it is then brought to a complete stop. At the same time, the results of the processing of scanned data corresponding to bill $B_2$ are stored in system memory. The ultimate result of this stopping procedure is that the CRU is brought to a complete halt following the point where the scanning of bill $B_2$ has been reliably completed since the scan procedure is not subjected to the disruptive effects (backlash, etc.) which would result if a complete halt were attempted immediately after bill $B_1$ is identified as a "no call."

More importantly, the reduced operating speed of the machine at the end of the deceleration phase is such that the CRU can be brought to a total halt before the next following bill $B_3$ has been transported over the optical scanhead. Thus, when the CRU is in fact halted, bill $B_1$ is positioned at the top of the system stacker, bill $B_2$ is maintained in transit between the optical scanhead and the stacker after it has been subjected to scanning, and the following bill $B_3$ is stopped short of the optical scanhead.

Figure 8A:
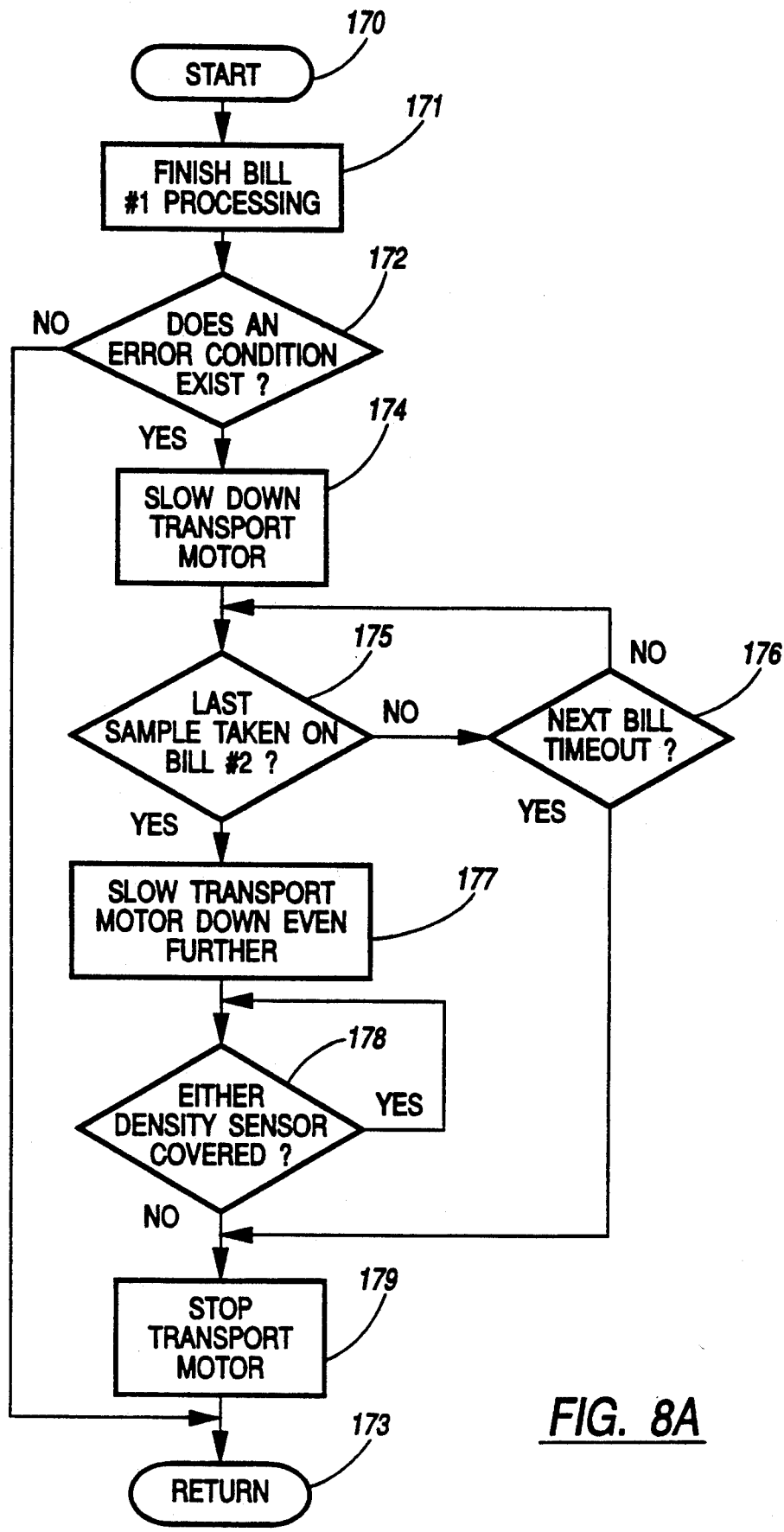

When the CRU is restarted, presumably after corrective action has been taken responsive to the "minor" error which led to the CRU being stopped (such as the removal of the "no call" bill from the top of the stacker), the overall bill recognition/counting operation can be resumed in an uninterrupted fashion by using the stored call results for bill $B_2$ as the basis for updating the system count appropriately, moving bill $B_2$ from its earlier transitional position along the transport path into the stacker, and moving bill $B_3$ along the transport path into the optical scanhead area where it can be subjected to normal scanning and processing. A routine for executing the deceleration/stopping procedure described above is illustrated by the flow chart in FIG. 8A. This routine is initiated at step 170 with the CRU in its normal operating mode. At step 171, a test bill $B_1$ is scanned and the data reflectance samples resulting therefrom are processed. Next, at step 172, a determination is made as to whether or not test bill $B_1$ is a "no call" using predefined criteria in combination with the overall bill recognition procedure, such as the routine of FIG. 8. If the answer at step 172 is negative, i.e., the test bill $B_1$ can be identified, step 173 is accessed where normal bill processing is continued in accordance with the procedures described above. If, however, the test bill $B_1$ is found to be bad at step 172, step 174 is accessed where CRU slowdown is initiated, e.g., the transport drive motor speed is reduced to about one-third its normal speed.

Subsequently, the bad bill $B_1$ is guided to the stacker while, at the same time, the following test bill $B_2$ is brought under the optical scanhead and subjected to the scanning and processing steps. The call resulting from the scanning and processing of bill $B_2$ is stored in system memory at this point. Step 175 determines whether the scanning of bill $B_2$ is complete. When the answer is negative, step 176 determines whether a preselected "bill timeout" period has expired so that the system does not wait for the scanning of a bill that is not present. An affirmative answer at step 176 returns the system to the main program at step 175 while a negative answer at step 176 causes steps 175 and 176 to be reiterated until one of them produces an affirmative response.

An affirmative response at step 175 causes step 177 to further reduce the speed of the transport drive motor, i.e., to one-sixth the normal speed. Before stopping the transport drive motor, step 178 determines whether either of the sensors S1 or S2 (described below) is covered by a bill. A negative answer at step 178 indicates that the bill has cleared both sensors S1 and S2, and thus the transport drive motor is stopped at step 179. This signifies the end of the deceleration/stopping process. At this point in time, bill $B_2$ remains in transit while the following bill $B_3$ is stopped on the transport path just short of the optical scanhead.

Following step 179, corrective action responsive to the identification of a "no call" bill is conveniently undertaken; the top-most bill in the stacker is easily removed therefrom and the CRU is then in condition for resuming the recognition/counting process. Accordingly, the CRU can be restarted and the stored results corresponding to bill $B_2$, are used to appropriately update the system count. Next, the identified bill $B_2$ is guided along the transport path to the stacker, and the CRU continues with its normal processing routine.

Figure 9A:
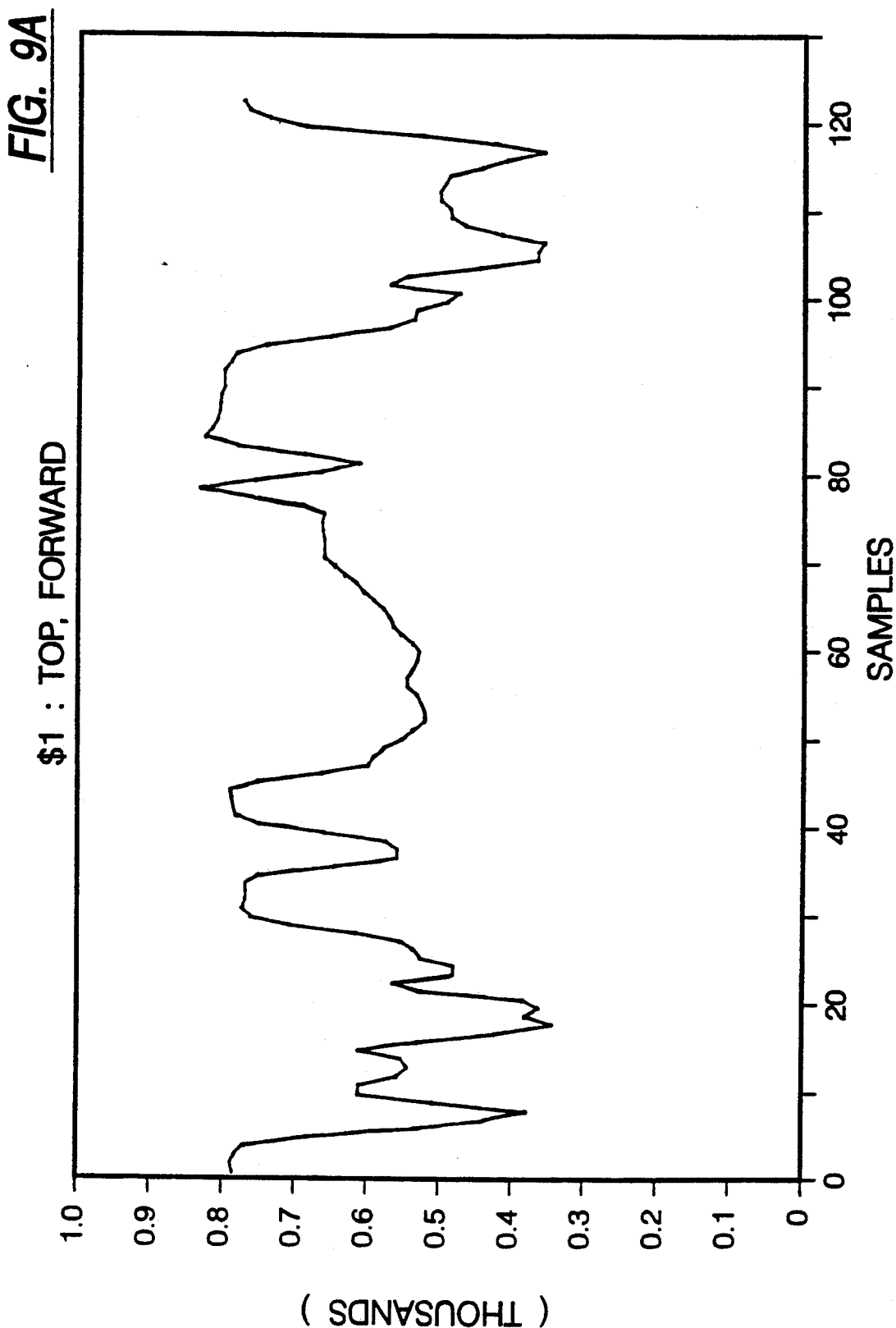
FIGS. 9A-C are graphical illustrations of representative characteristic patterns generated by narrow dimension optical scanning of a currency bill.
Figure 9B:
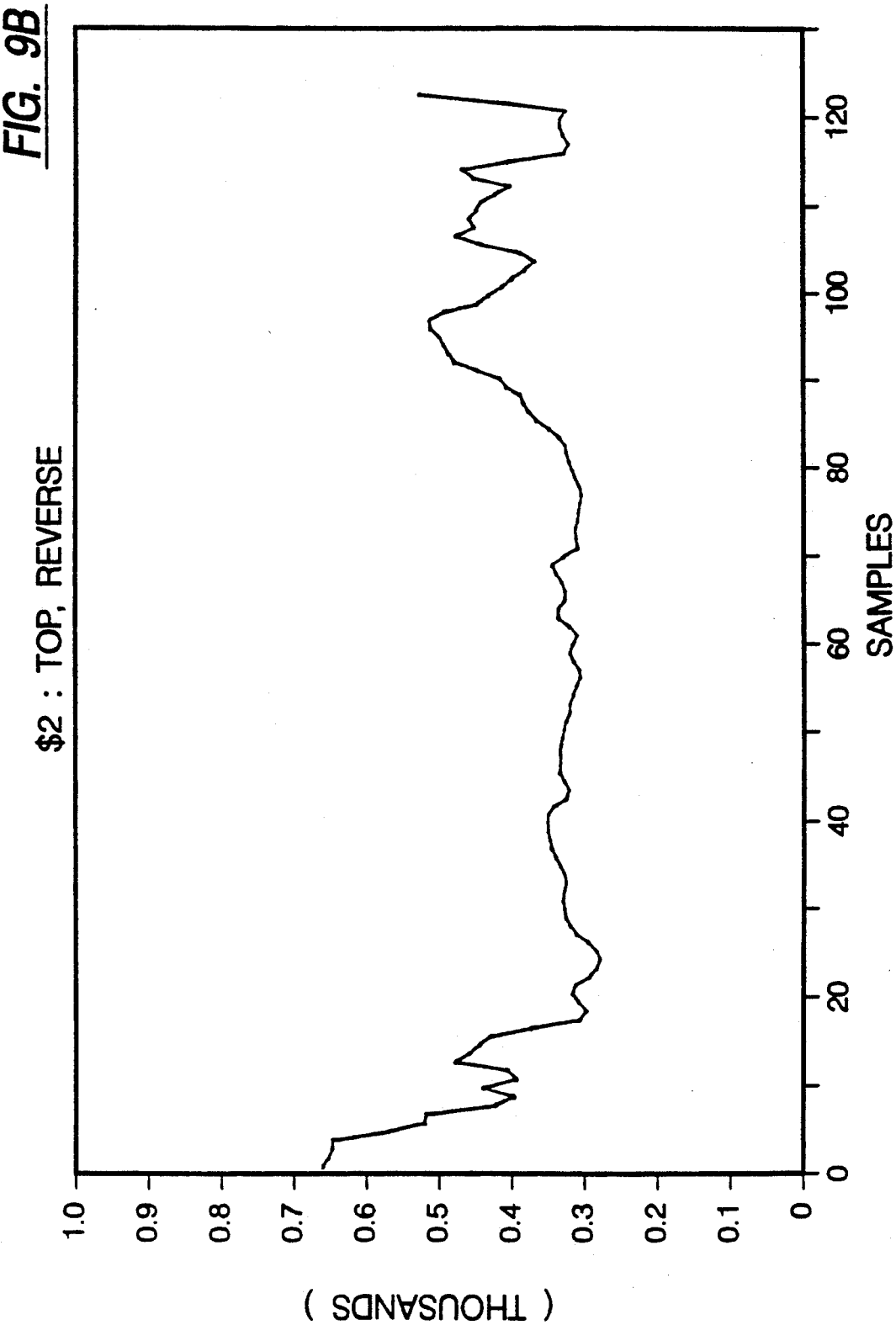
Figure 9C:
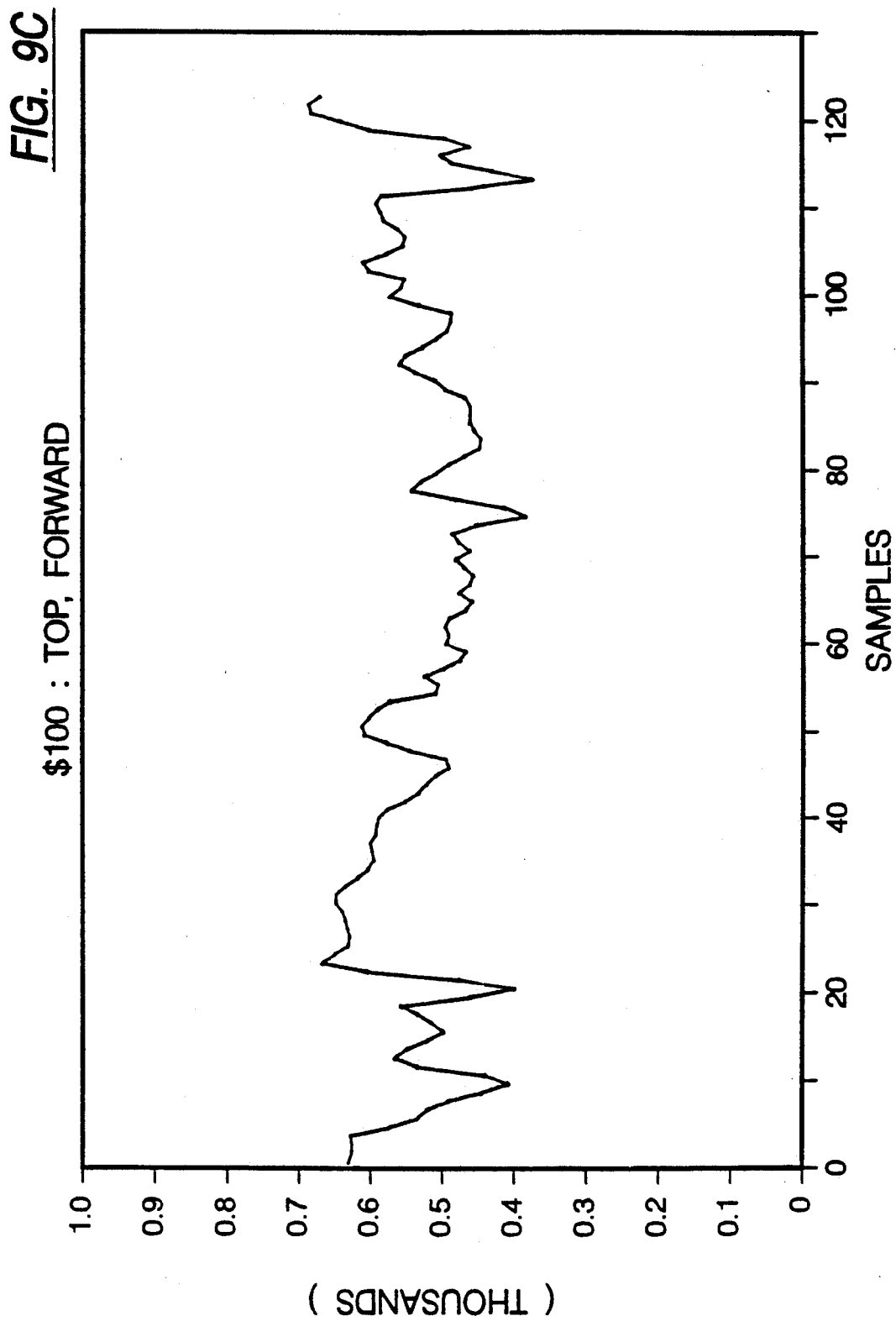

Referring now to FIGS. 9A–C there are shown three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 9A–C were generated by using 128 reflectance samples per bill scan, as opposed to the preferred use of only 64 samples. The marked difference existing between corresponding samples for these three test patterns is indicative of the high degree of confidence with which currency denominations may be called using the foregoing optical sensing and correlation procedure.

The optical sensing and correlation technique described above permits identification of pre-programmed currency denominations with a high degree of accuracy and is based upon a relatively low processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish between several currency denominations.

A major advantage with this approach is that it is not required that currency bills be scanned along their wide dimensions. Further, the reduction in the number of samples reduces the processing time to such an extent that additional comparisons can be made during the time available between the scanning of successive bills. More specifically, as described above, it becomes possible to compare a test pattern with two or more stored master characteristic patterns so that the system is made capable of identifying currency which is scanned in the "forward" or "reverse" directions along the green surface of the bill.

Another advantage accruing from the reduction in processing time realized by the present sensing and correlation scheme is that the response time involved in either stopping the transport of a bill that has been identified as "spurious", i.e., not corresponding to any of the stored master characteristic patterns, or diverting such a bill to a separate stacker bin, is correspondingly shortened. Accordingly, the system can conveniently be programmed to set a flag when a scanned pattern does not correspond to any of the master patterns. The identification of such a condition can be used to stop the bill transport drive motor for the mechanism. Since the optical encoder is tied to the rotational movement of the drive motor, synchronism can be maintained between pre- and post-stop conditions. In the dual-processor implementation discussed above, the information concerning the identification of a "spurious" bill would be included in the information relayed to the general processor unit which, in turn, would control the drive motor appropriately.

The correlation procedure and the accuracy with which a denomination is identified directly relates to the degree of correspondence between reflectance samples on the test pattern and corresponding samples on the stored master patterns. Thus, shrinkage of "used" bills which, in turn, causes corresponding reductions in their narrow dimensions, can possibly produce a drop in the degree of correlation between such used bills of a given denomination and the corresponding master patterns. Currency bills which have experienced a high degree of usage exhibit such a reduction in both the narrow and wide dimensions of the bills. While the sensing and correlation technique of this invention remains relatively independent of any changes in the wide dimension of bills, reduction along the narrow dimension can affect correlation factors by realizing a relative displacement of reflectance samples obtained as the "shrunk" bills are transported across the scanhead.

In order to accommodate or nullify the effect of such narrow dimension shrinking, the above-described correlation technique can be modified by use of a progressive shifting approach whereby a test pattern which does not correspond to any of the master patterns is partitioned into predefined sections, and samples in successive sections are progressively shifted and compared again to the stored patterns in order to identify the denomination. It has experimentally been determined that such progressive shifting effectively counteracts any sample displacement resulting from shrinkage of a bill along its narrow dimension.

The progressive shifting effect is best illustrated by the correlation patterns shown in FIGS. 10A–D. For purposes of clarity, the illustrated patterns were generated using 128 samples for each bill scan as compared to the preferred use of 64 samples. FIG. 10A shows the correlation between a test pattern (represented by a heavy line) and a corresponding master pattern (represented by a thin line). It is clear from FIG. 10A that the degree of correlation between the two patterns is relatively low and exhibits a correlation factor of 606.

The manner in which the correlation between these patterns is increased by employing progressive shifting is best illustrated by considering the correlation at the reference points designated as A–E along the axis defining the number of samples. The effect on correlation produced by "single" progressive shifting is shown in FIG. 10B which shows "single" shifting of the test pattern of FIG. 10A. This is effected by dividing the test pattern into two equal segments each comprising 64 samples. The first segment is retained without any shift, whereas the second segment is shifted by a factor of one data sample. Under these conditions, it is found that the correlation factor at the reference points located in the shifted section, particularly at point E, is improved.

FIG. 10C shows the effect produced by "double" progressive shifting whereby sections of the test pattern are shifted in three stages. This is accomplished by dividing the overall pattern into three approximately equal sized sections. Section one is not shifted, section two is shifted by one data sample (as in FIG. 10B), and section three is shifted by a factor of two data samples. With "double" shifting, it can be seen that the correlation factor at point E is further increased.

On a similar basis, FIG. 10D shows the effect on correlation produced by "triple" progressive shifting where the overall pattern is first divided into four (4) approximately equal sized sections. Subsequently, section one is retained without any shift, section two is shifted by one data sample, section three is shifted by two data samples, and section four is shifted by three data samples. Under these conditions, the correlation factor at point E is seen to have increased again.

FIG. 10E shows the effect on correlation produced by "quadruple" shifting, where the pattern is first divided into five (5) approximately equal sized sections. The first four (4) sections are shifted in accordance with the "triple" shifting approach of FIG. 10D, whereas the fifth section is shifted by a factor of four (4) data samples. From FIG. 10E it is clear that the correlation at point E is increased almost to the point of superimposition of the compared data samples.

The advantage of using the progressive shifting approach, as opposed to merely shifting by a set amount of data samples across the overall test pattern, is that the improvement in correlation achieved in the initial sections of the pattern as a result of shifting is not neutralized or offset by any subsequent shifts in the test pattern. It is apparent from the above figures that the degree of correlation for sample points falling within the progressively shifted sections increases correspondingly.

More importantly, the progressive shifting realizes substantial increases in the overall correlation factor resulting from pattern comparison. For instance, the original correlation factor of 606 (FIG. 10A) is increased to 681 by the "single" shifting shown in FIG. 10B. The "double" shifting shown in FIG. 10C increases the correlation number to 793, the "triple" shifting of FIG. 10D increases the correlation number to 906, and, finally, the "quadruple" shifting shown in FIG. 10E increases the overall correlation number to 960. Using the above approach, it has been determined that used currency bills which exhibit a high degree of narrow dimension shrinkage and which cannot be accurately identified as belonging to the correct currency denomination when the correlation is performed without any shifting, can be identified with a high degree of certainty by using progressive shifting approach, preferably by adopting "triple" or "quadruple" shifting.

Figure 11:
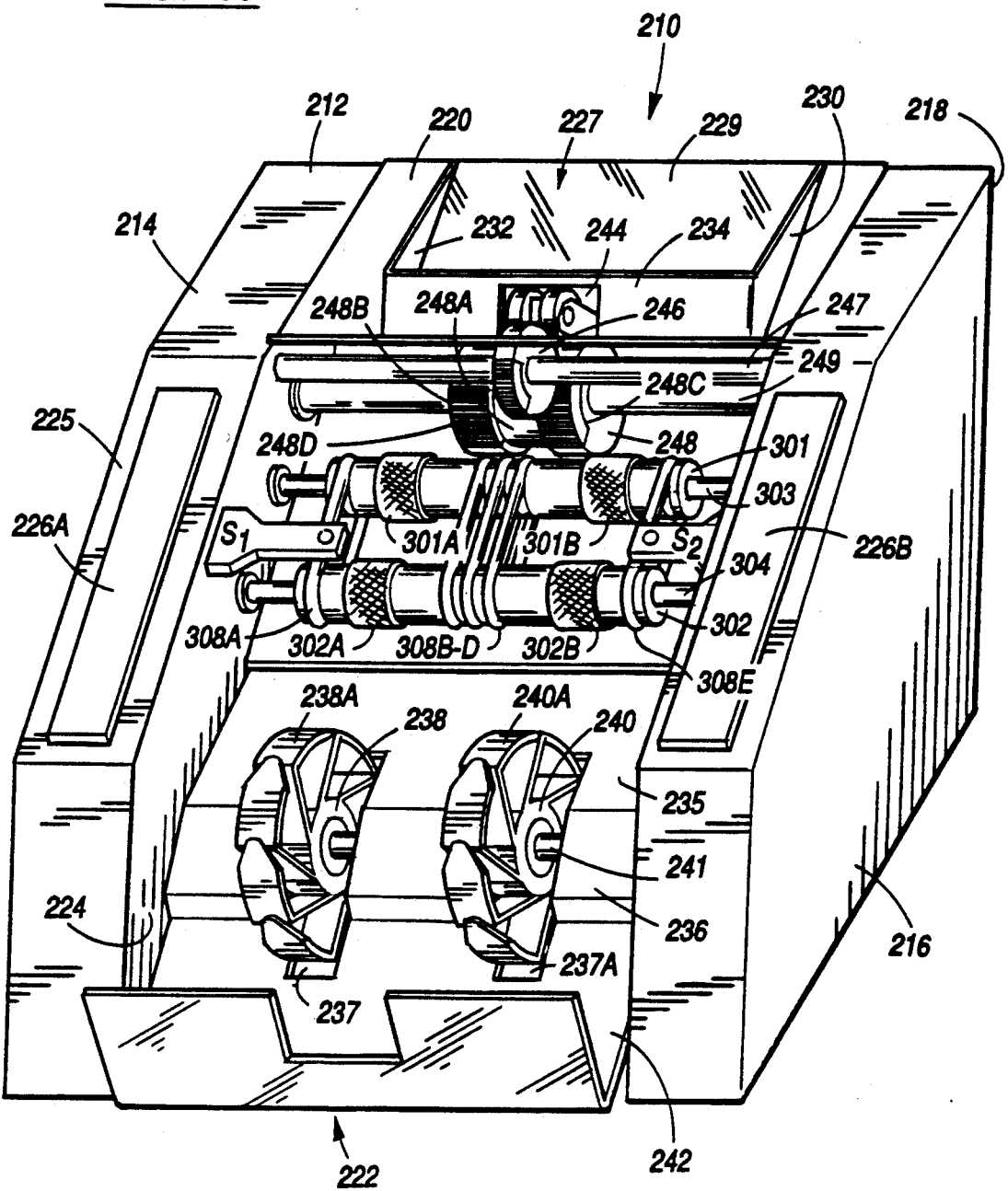
FIG. 11 is a perspective view showing currency discrimination and counting apparatus particularly adapted to and embodying the optical sensing and correlation technique of this invention.

Referring now to FIG. 11, there is shown apparatus 210 for currency discrimination and counting which embodies the principles of the present invention. The apparatus comprises a housing 212 which includes left and right hand sidewalls 214 and 216, respectively, a rear wall 218, and a top surface generally designated as 220. The apparatus has a front section 222 which comprises a generally vertical forward section 224 and a forward sloping section 225 which includes side sections provided with control panels 226A and 226B upon which various control switches for operating the apparatus, as well as associated display means, are mounted.

For accepting a stack of currency bills 228 (FIG. 12) which have to be discriminated according to denomination, an input bin 227 is defined on the top surface 220 by a downwardly sloping support surface 229 on which are provided a pair of vertically disposed side walls 230, 232 linked together by a vertically disposed front wall 234. The walls 230, 232 and 234, in combination with the sloping surface 229, define an enclosure where the stack of currency bills 228 is positioned.

From the input bin, currency bills are moved along a tri-sectional transport path which includes an input path where bills are moved along a first direction in a substantially flat position, a curved guideway where bills are accepted from the input path and guided in such a way as to change the direction of travel to a second different direction, and an output path where the bills are moved in a flat position along the second different direction across currency discrimination means located downstream of the curved guideway, as will be described in detail below. In accordance with the improved optical sensing and correlation technique of this invention, the transport path is defined in such a way that currency bills are accepted, transported along the input path, the curved guideway, and the output path, and stacked with the narrow dimension "W" of the bills being maintained parallel to the transport path and the direction of movement at all times.

The forward sloping section 225 of the document handling apparatus 210 includes a platform surface 235 centrally disposed between the side walls 214, 216 and is adapted to accept currency bills which have been processed through the currency discrimination means for delivery to a stacker plate 242 where the processed bills are stacked for subsequent removal. More specifically, the platform 235 includes an associated angular surface 236 and is provided with openings 237, 237A from which flexible blades 238A, 240A of a corresponding pair of stacker wheels 238, 240, respectively, extend outwardly. The stacker wheels are supported for rotational movement about a stacker shaft 241 disposed about the angular surface 236 and suspended across the side walls 214 and 216. The flexible blades 238A, 240A of the stacker wheels cooperate with the stacker platform 235 and the openings 237, 237A to pick up currency bills delivered thereto. The blades operate to subsequently deliver such bills to a stacker plate 242 which is linked to the angular surface 236 and which also accommodates the stacker wheel openings and the wheels projecting therefrom. During operation, a currency bill which is delivered to the stacker platform 235 is picked up by the flexible blades and becomes lodged between a pair of adjacent blades which, in combination, define a curved enclosure which decelerates a bill entering therein and serves as a means for supporting and transferring the bill from the stacker platform 235 onto the stacker plate 242 as the stacker wheels rotate. The mechanical configuration of the stacker wheels and the flexible blades provided thereupon, as well as the manner in which they cooperate with the stacker platform and the stacker plate, is conventional and, accordingly, is not described in detail herein.

The bill handling and counting apparatus 210 is provided with means for picking up or "stripping" currency bills, one at a time, from bills that are stacked in the input bin 227. In order to provide this stripping action, a feed roller 246 is rotationally suspended about a drive shaft 247 which, in turn, is supported across the side walls 214, 216. The feed roller 246 projects through a slot provided on the downwardly sloping surface 229 of the input bin 227 which defines the input path and is in the form of an eccentric roller at least a part of the periphery of which is provided with a relatively high friction-bearing surface 246A. The surface 246A is adapted to engage the bottom bill of the bill stack 228 as the roller 246 rotates; this initiates the advancement of the bottom bill along the feed direction represented by the arrow 247B (see FIG. 13). The eccentric surface of the feed roller 246 essentially "jogs" the bill stack once per revolution so as to agitate and loosen the bottom currency bill within the stack, thereby facilitating the advancement of the bottom bill along the feed direction.

The action of the feed roller 246 is supplemented by the provision of a capstan or drum 248 which is suspended for rotational movement about a capstan drive shaft 249 which, in turn, is supported across the side walls 214 and 216. Preferably, the capstan 248 comprises a centrally disposed friction roller 248A having a smooth surface and formed of a friction-bearing material such as rubber or hard plastic. The friction roller is sandwiched between a pair of capstan rollers 248B and 248C, at least a part of the external peripheries of which are provided with a high friction-bearing surface 248D.

The friction surface 248D is akin to the friction surface 246A provided on the feed roller and permits the capstan rollers to frictionally advance the bottom bill along the feed direction. Preferably, the rotational movement of the capstan 248 and the feed roller 246 is synchronized in such a way that the frictional surfaces provided on the peripheries of the capstan and the feed roller rotate in unison, thereby inducing complimentary frictional contact with the bottom bill of the bill stack 228.

In order to ensure active contact between the capstan 248 and a currency bill which is jogged by the feed roller 246 and is in the process of being advanced frictionally by the capstan rollers 248B, 248C, a pair of picker rollers 252A, 252B, are provided for exerting a consistent downward force onto the leading edges of the currency bills stationed in the input bin 227. The picker rollers are supported on corresponding picker arms 254A, 254B which, in turn, are supported for arcuate movement about a support shaft 256 suspended across the side walls of the apparatus. The picker rollers are free wheeling about the arms and when there are no currency bills in contact with the capstan 248, bear down upon the friction roller 248A and, accordingly, are induced into counter-rotation therewith. However, when currency bills are present and are in contact with the capstan 248, the picker rollers bear down into contact with the leading edges of the currency bills and exert a direct downward force on the bills since the rotational movement of rollers is inhibited. The result is that the advancing action brought about by contact between the friction-bearing surfaces 248D on the capstan rollers 248B, 248C is accentuated, thereby facilitating the stripping away of a single currency bill at a time from the bill stack 228.

In between the picker arms 254A, 254B, the support shaft 256 also supports a separator arm 260 which carries at its end remote from the shaft a stationary stripper shoe 258 which is provided with a frictional surface which imparts a frictional drag upon bills onto which the picker rollers bear down. The separator arm is mounted for arcuate movement about the support shaft 256 and is spring loaded in such a way as to bear down with a selected amount of force onto the capstan.

In operation, the picker rollers rotate with the rotational movement of the friction roller 248A due to their free wheeling nature until the leading edges of one or more currency bills are encountered. At that point, the rotational movement of the picker rollers stops and the leading edges of the bills are forced into positive contact with the friction bearing surfaces on the periphery of the capstan rollers. The effect is to force the bottom bill away from the rest of the bills along the direction of rotation of the capstan. At the same time, the separator shoe 258 also bears down on any of the bills that are propelled forward by the capstan rollers.

The tension on the picker arm 254A is selected to be such that the downward force exerted upon such a propelled bill allows only a single bill to move forward. If two or more bills happen to be propelled out of the contact established between the picker rollers and the capstan rollers, the downward force exerted by the spring loaded shoe should be sufficient to inhibit further forward movement of the bills. The tension under which the picker arm is spring loaded can be conveniently adjusted to control the downward bearing force exerted by the shoe in such a way as to compliment the bill stripping action produced by the picker rollers and the capstan rollers. Thus, the possibility that more than two bills may be propelled forward at the same time due to the rotational movement of the capstan is significantly reduced.

The bill transport path includes a curved guideway 270 provided in front of the capstan 248 for accepting currency bills that have been propelled forward along the input path defined by the forward section of the sloping surface 229 into frictional contact with the rotating capstan. The guideway 270 includes a curved section 272 which corresponds substantially to the curved periphery of the capstan 248 so as to compliment the impetus provided by the capstan rollers 248B, 248C to a stripped currency bill.

A pair of idler rollers 262A, 262B is provided downstream of the picker rollers for guiding bills propelled by the capstan 248 into the curved guideway 270. More specifically, the idler rollers are mounted on corresponding idler arms 264A, 264B which are mounted for arcuate movement about an idler shaft 266 which, in turn, is supported across the side walls of the apparatus. The idler arms are spring loaded on the idler shaft so that a selected downward force can be exerted through the idler rollers onto a stripped bill, thereby ensuring continued contact between the bill and the capstan 248 until the bill is guided into the curved section 272 of the guideway 270.

A modifed feed mechanism is described in the assignee's copending U.S. patent application Ser. No. 07/680,585, filed Apr. 4, 1991, for "Feed Arrangement For Currency Handling Machines," which is incorporated herein by reference.

Figure 13:
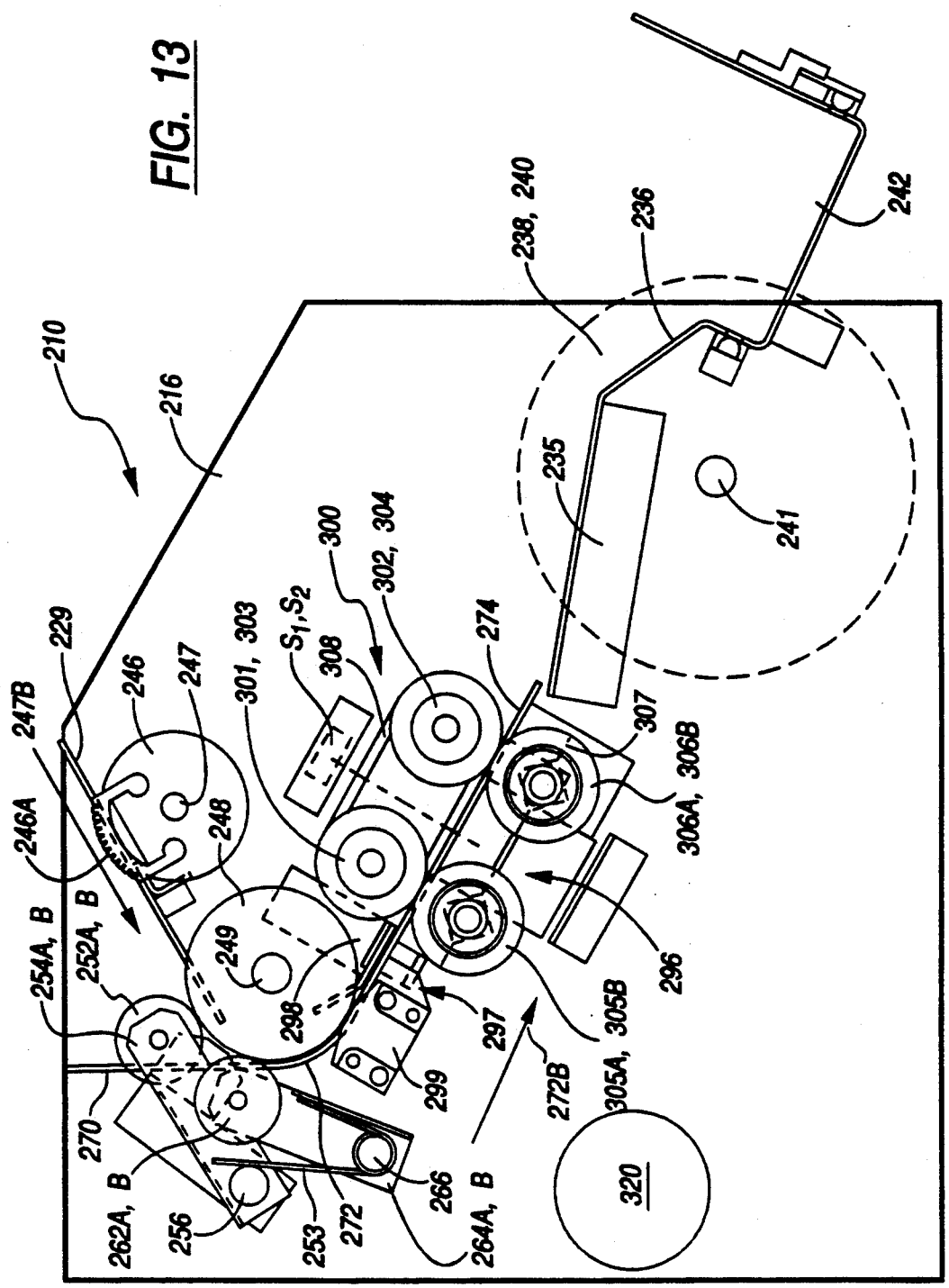
FIG. 13 is a side view of the apparatus of FIG. 11 illustrating the separation mechanism and the transport path.

Downstream of the curved section 272, the bill transport path has an output path for currency bills. The output path is provided in the form of a flat section 274 along which bills which have been guided along the curved guideway 270 by the idler rollers 262A, 262B are moved along a direction which is opposite to the direction along which bills are moved out of the input bin. The movement of bills along the direction of rotation of the capstan, as induced by the picker rollers 252A, 252B and the capstan rollers 248B, 248C, and the guidance provided by the section 272 of the curved guideway 270 changes the direction of movement of the currency bills from the initial movement along the sloping surface 229 of input bin 227 (see arrow 247B in FIG. 13) to a direction along the flat section 274 of the output path, as best illustrated in FIG. 13 by the arrow 272B.

Thus, a currency bill which is stripped from the bill stack in the input bin is initially moved along the input path under positive contact between the picker rollers 252A, 252B and the capstan rollers 248B, 248C. Subsequently, the bill is guided through the curved guideway 270 under positive contact with the idler rollers 262A, 262B onto the flat section 274 of the output path.

In the output path, currency bills are positively guided along the flat section 274 by means of a transport roller arrangement which includes a pair of axially spaced, positively driven transport rollers 301, 302 which are respectively disposed on transport shafts 303 and 304 supported across the sidewalls of the apparatus. The first transport roller 301 includes a pair of projecting cylindrical sections 301A, 301B which preferably have a high-friction outer surface, such as by the provision of knurling thereupon. The second transport roller 302 which is downstream of the first roller along the flat section of the transport path also has similar cylindrical high-friction knurled sections 302A and 302B.

The flat section 274 is provided with openings through which each of the knurled sections of the transport rollers 301 and 302 are subjected to counter-rotating contact with corresponding passive transport rollers 305A, 305B, 306A and 306B. The passive rollers are mounted below the flat section 274 of the transport path in such a manner as to be freewheeling about their axes and biased into counter-rotating contact with the corresponding knurled sections of the first and second transport rollers. While any appropriate mechanical suspending and pressuring arrangement may be used for this purpose, in the illustrative embodiment passive rollers 305A and 306A are biased into contact with knurled sections 301A and 302B by means of an H-shaped leaf spring 307. The rollers are cradled in a freewheeling fashion within each of the two cradle sections of the spring through a support shaft (not shown) appropriately suspended about the spring. The arrangement is such that the leaft spring 307 is mounted relative to the passive rollers 305A and 306A in such a way that a controllable amount of pressure is exerted against the rollers and pushes them against the active rollers 301 and 302. A similar leaf spring/suspension arrangement is used to mount the other set of passive rollers 305B and 306B into spring-loaded, freewheeling counter-rotating contact with the knurled sections 301B and 302B of the active transport rollers 301 and 302.

Preferably, the points of contact between the active and passive rollers are made coplanar with the output path so that currency bills can be moved or positively guided along the path in a flat manner under the positive contact of the opposingly disposed active and passive rollers.

The distance between the two active transport rollers and, of course, the corresponding counter-rotating passive rollers, is selected to be just short of the length of the narrow dimension of the currency bills that are to be discriminated. Accordingly, currency bills are firmly gripped under uniform pressure between the two sets of active and passive rollers within the scanhead area, thereby minimizing the possiblity of bill skew and enhancing the reliability of the overall scanning and recognition process.

The first active transport roller 301 is driven at a speed substantially higher than that of the capstan rollers in the feed section. Since the passive rollers are freewheeling and the active rollers are positively driven, the first transport roller 301 causes a bill that comes between the roller and its corresponding passive rollers 305A, 305B along the flat section of the output path to be pulled into the nip formed between the active and passive rollers (more specifically, between these passive rollers and the corresponding knurled sections 301A, 301B on the active transport roller). The higher speed of the active transport roller imparts an abrupt acceleration to the bill which strips the bill away from any other bills that may have been guided into the curved guideway along with the particular bill being acted upon by the transport roller.

Currency bills are subsequently moved downstream of the first transport roller along the flat section into the nip formed between the knurled sections 302A, 302B on the second active transport roller 302 and the corresponding passive rollers 306A, 306B with the second active transport roller being driven at the same speed as that of the first transport roller.

The disposition of the second transport roller is selected to be such that the positive contact exerted by the cylindrical knurled sections 302A, 302BA on the second transport roller 302 and the corresponding passive rollers 306A, 306B upon a currency bill moving along the output path occurs before the bill is released from the similar positive contact between the knurled sections 301A, 301B on the first transport roller 301 and the corresponding passive rollers 305A, 305B. As a result, the second transport roller 302 and its corresponding passive rollers 306A, 306B together positively guide a currency bill through the scanhead area (where the transport rollers are located) onto the stacker platform 235, from where the stacker wheels 238, 240 pick up the bill and deposit it onto the stacker place 242.

Bills are held flat against the scanhead 18 by means of a plurality of O-rings 308 which are disposed in corresponding grooves 309 on the transport rollers 301 and 302. In a preferred arrangement, five such O-rings 308A–E are used, one at each end of the transport rollers and three in the central regions of the rollers.

The positive guiding arrangement described above is advantageous in that uniform guiding pressure is maintained upon bills as they are transported through the optical scanhead area; more importantly, this is realized without adding significantly to mechanical complexity. In effect, the bill feeding operation is made stable, and twisting or skewing of currency bills is substantially reduced. This positive action is supplemented by the use of the H-spring for uniformly biasing the passive rollers into contact with the active rollers so that bill twisting or skew resulting from differential pressure applied to the bills along the transport path is avoided. The O-rings 308 function as simple, yet extremely effective means for ensuring that the bills are held flat. Since the O-rings constitute standard off-the shelf items, any adjustment of the center distance between the two active transport rollers can be conveniently accommodated.

Figure 12:
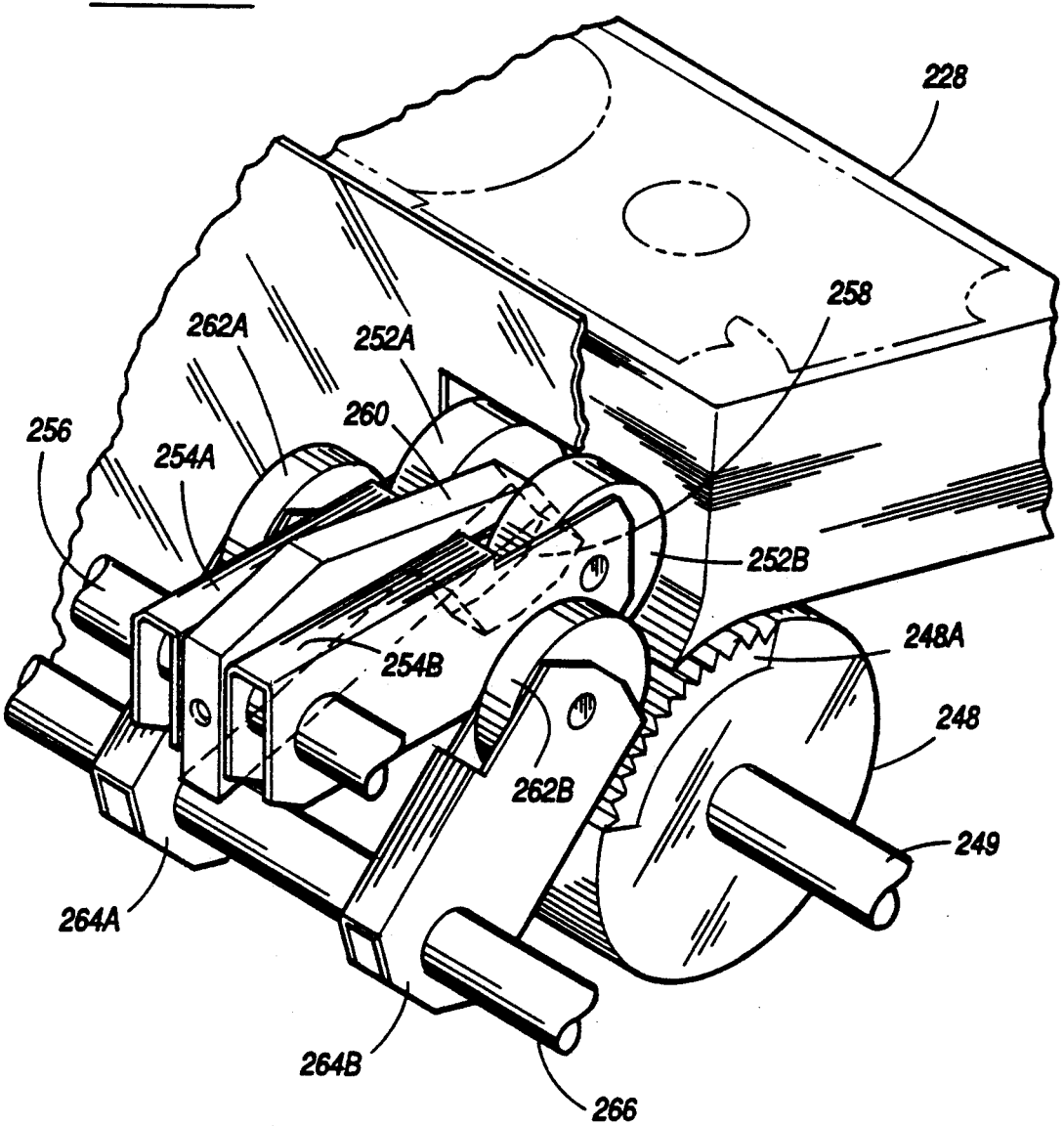
FIG. 12 is a partial perspective view illustrating the mechanism used for separating currency bills and injecting them in a sequential fashion into the transport path.
Figure 14:
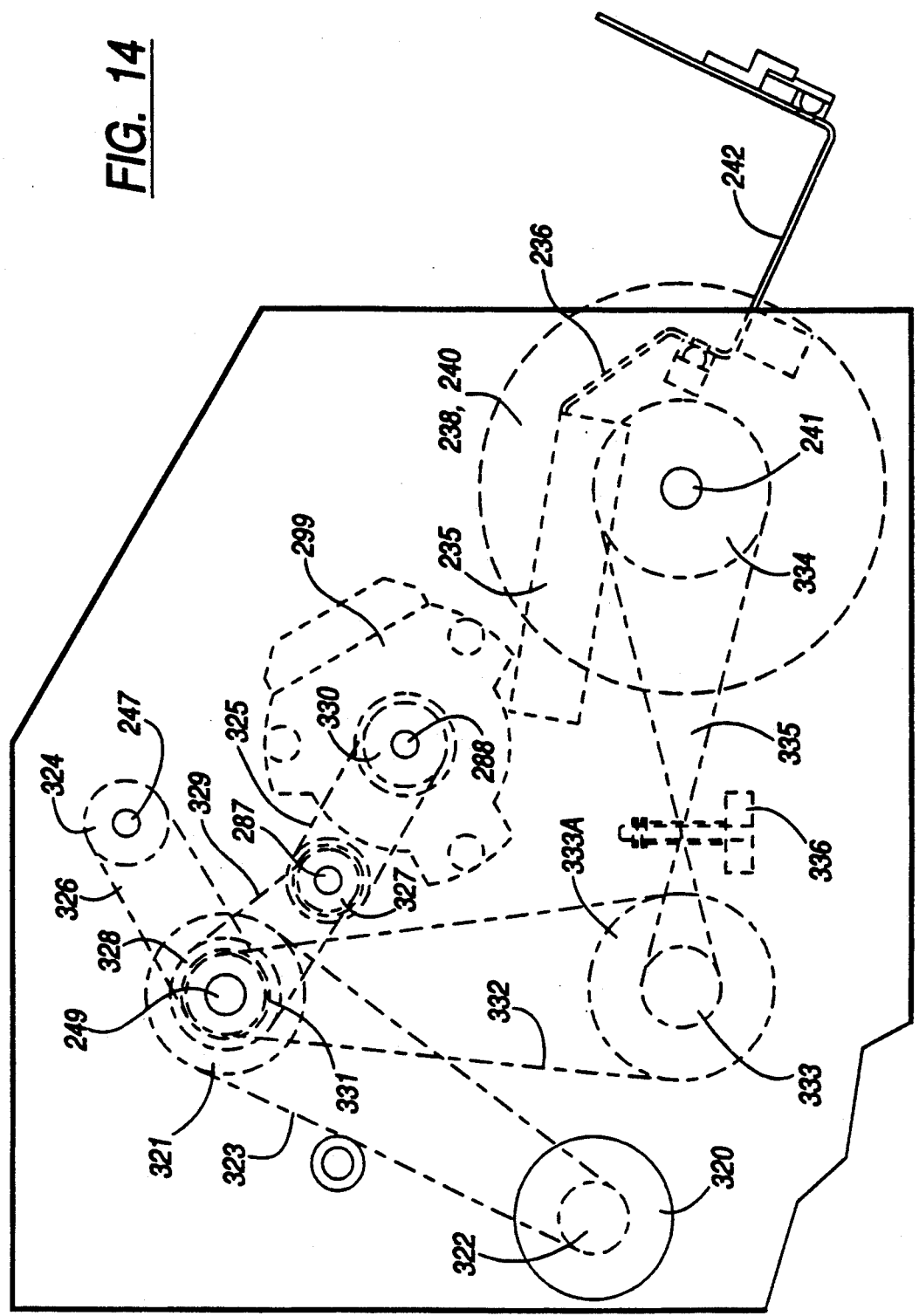
FIG. 14 is a side view of the apparatus of FIG. 11 illustrating details of the drive mechanism.
Figure 15:
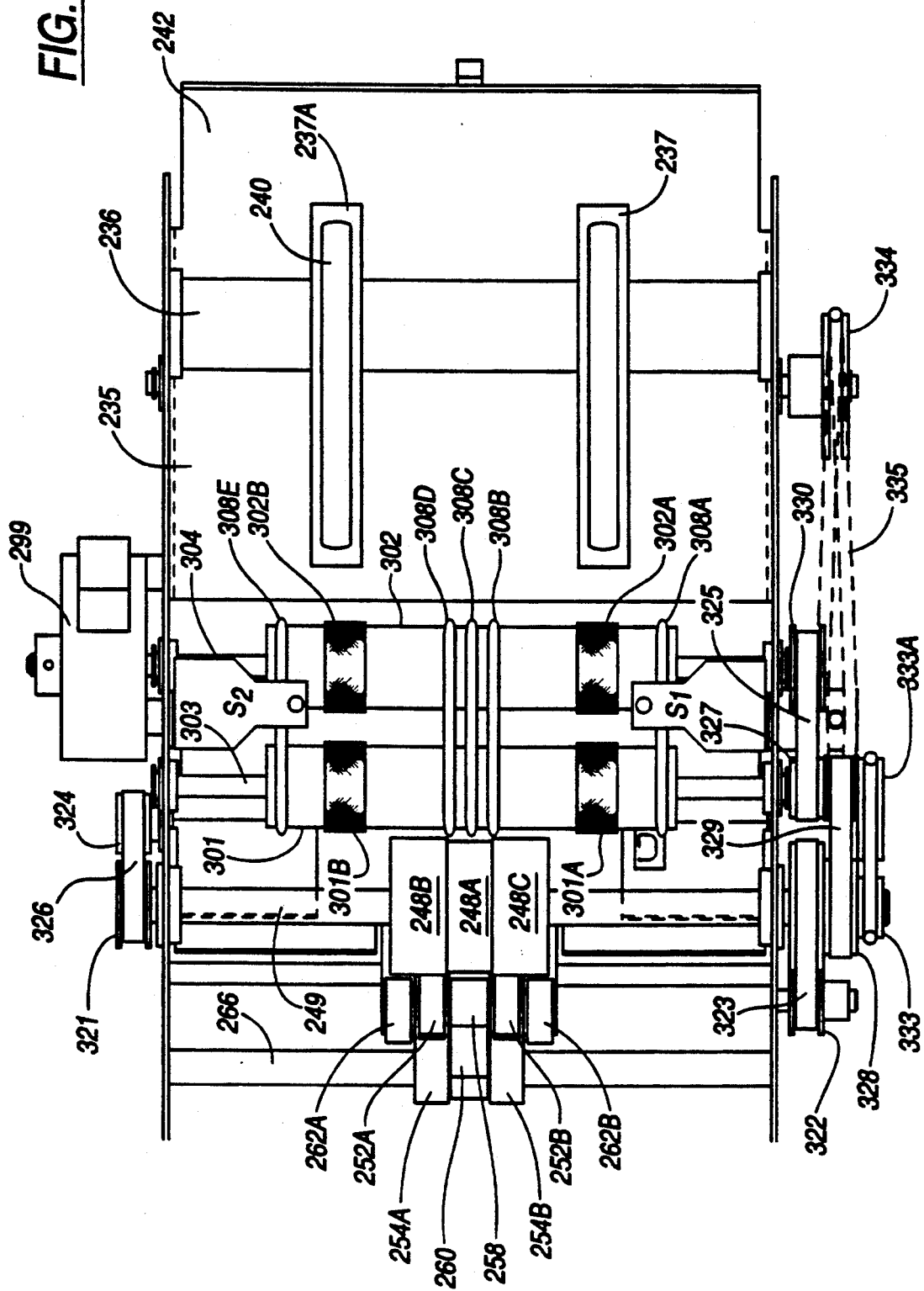
FIG. 15 is a top view of the currency discriminating and counting apparatus shown in FIGS. 11-14.

Referring now in particular to FIGS. 14 and 15, there are shown side and top views, respectively, of the document processing apparatus of FIGS. 11–13, which illustrate the mechanical arrangement for driving the various means for transporting currency bills along the three sections of the transport path, i.e., along the input path, the curved guideway and the output path. As shown therein, a motor 320 is used to impart rotational movement to the capstan shaft 249 by means of a belt-/pulley arrangement comprising a pulley 321 provided on the capstan shaft 249 and which is linked to a pulley 322 provided on the motor drive shaft through a belt 323. The diameter of the driver pulley 321 is selected to be appropriately larger than that of the motor pulley 322 in order to achieve the desired speed reduction from the typically high speed at which the motor 320 operates.

The drive shaft 247 for the drive roller 246 is provided with rotary motion by means of a pulley 324 provided thereupon which is linked to a corresponding pulley 321 provided on the capstan shaft 249 through a belt 326. The pulleys 324 and 321 are of the same diameter so that the drive roller shaft 247 and, hence, the drive roller 246, rotate in unison with the capstan 248 mounted on the capstan shaft 249.

In order to impart rotational movement to the transport rollers, a pulley 327 is mounted on the transport roller shaft 287 corresponding to the first set of transport rollers and is linked to a corresponding pulley 328 on the capstan shaft 249 through a belt 329. The diameter of the transport roller pulley 327 is selected to be appropriately smaller than that of the corresponding capstan pulley 328 so as to realize a stepping-up in speed from the capstan rollers to the transport rollers. The second set of transport rollers mounted on the transport roller shaft 288 is driven at the same speed as the rollers on the first set of transport rollers by means of a pulley 330 which is linked to the transport pulley 327 by means of a belt 325.

As also shown in FIGS. 14 and 15, an optical encoder 299 is mounted on one of the transport roller shafts, preferably the passively driven transport shaft 288, for precisely tracking the lateral displacement of bills supported by the transport rollers in terms of the rotational movement of the transport shafts, as discussed in detail above in connection with the optical sensing and correlation technique of this invention.

In order to drive the stacker wheels 238 and 240, an intermediate pulley 330 is mounted on suitable support means (not shown) and is linked to a corresponding pulley 331 provided on the capstan shaft 249 through a belt 332. Because of the time required for transporting currency bills which have been stripped from the currency stack in the input bin through the tri-sectional transport path and onto the stacker platform, the speed at which the stacker wheels can rotate for delivering processed bills to the stacker plate is necessarily less than that of the capstan shaft. Accordingly, the diameter of the intermediate pulley 333a is selected to be larger than that of the corresponding capstan pulley 331 so as to realize a reduction in speed. The intermediate pulley 333a has an associated pulley 333 which is linked to a stacker pulley 334 provided on the drive shaft 241 for the stacker wheels 238, 240 by means of a belt 335. In the preferred embodiment shown in FIGS. 11–15, the stacker wheels 238, 240 rotate in the same direction as the capstan rollers. This is accomplished by arranging the belt 335 between the pulleys 333, 334 in a "Figure-8" configuration about an anchoring pin 336 disposed between the two pulleys.

The curved section 272 of the guideway 270 is provided on its underside with an optical sensor arrangement 299, including an LED 298, for performing standard currency handling operations such as counterfiet detection using conventional techniques, doubles detection, length detection, skew detection, etc. However, unlike conventional arrangements, currency discrimination according to denomination is not performed in this area, for reasons described below.

According to a feature of this invention, optical scanning of currency bills, in accordance with the above-described improved optical sensing and correlation technique, is performed by means of an optical scanhead 296 which is disposed downstream of the curved guideway 270 along the flat section 274 of the output path. More specifically, the scanhead 296 is located under the flat section of the output path between the two sets of transport rollers. The advantage of this approach is that optical scanning is performed on bills when they are maintained in a substantially flat position as a result of positive contact between the two sets of transport rollers at both ends of the bill along their narrow dimension.

It should be understood that the above-described drive arrangement is provided for illustrative purposes only. Alternate arrangements for imparting the necessary rotational movement to generate movement of currency bills along the tri-sectional transport path can be used just as effectively. It is important, however, that the surface speed of currency bills across the two sets of transport rollers be greater than the surface speed of the bills across the capstan rollers in order to achieve optimum bill separation. It is this difference in speed that generates the abrupt acceleration of currency bills as the bills come into contact with the first set of transport rollers.

The drive arrangement may also include a one-way clutch (not shown) provided on the capstan shaft and the capstan shafts, the transport roller shafts and the stacker wheel shafts may be fitted with fly-wheel arrangements (not shown). The combination of the one-way clutch and the fly wheels can be used to advantage in accelerated batch processing of currency bills by ensuring that any bills remaining in the transport path after currency discrimination are automatically pulled off the transport path into the stacker plate as a result of the inertial dynamics of the fly wheel arrangements.

As described above, implementation of the optical sensing and correlation technique of this invention requires only a relatively low number of reflectance samples in order to adequately distinguish between several currency denominations. Thus, highly accurate discrimination becomes possible even though currency bills are scanned along their narrow dimension. However, the accuracy with which a denomination is identified is based on the degree of correlation between reflectance samples on the test pattern and corresponding samples on the stored master patterns. Accordingly, it is important that currency bills be transported across the discrimination means in a flat position and, more importantly, at a uniform speed.

This is achieved in the bill handling apparatus of FIGS. 11–15, by positioning the optical scanhead 296 on one side of the flat section 274 of the output path between the two sets of transport rollers. In this area, currency bills are maintained in positive contact with the two sets of rollers, thereby ensuring that the bills move across the scanhead in a substantially flat fashion. Further, a uniform speed of bill movement is maintained in this area because the second set of passive transport rollers is driven at a speed identical to that of the active transport rollers by means of the drive connection between the two sets of rollers. Disposing the optical scanhead 296 in such a fashion downstream of the curved guideway 270 along the flat section 274 maintains a direct correspondence between reflectance samples obtained by the optically scanning of bills to be discriminated and the corresponding samples in the stored master patterns.

Figure 18:
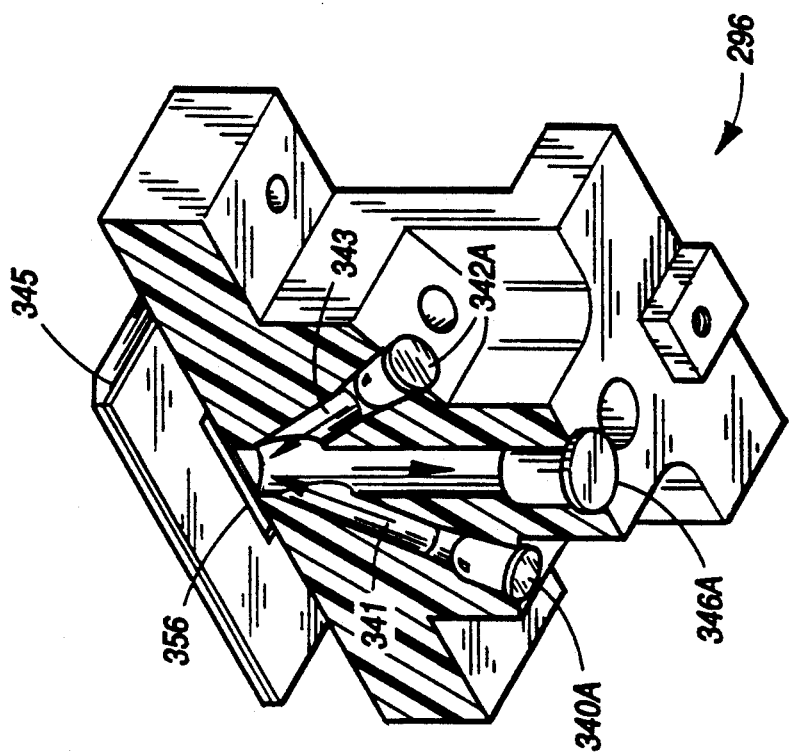
FIG. 18 is a bottom perspective view of the scanhead of FIG. 16, with the body portion of the scanhead sectioned along a vertical plane passing through the narrow slit at the top of the scanhead.
Figure 17:
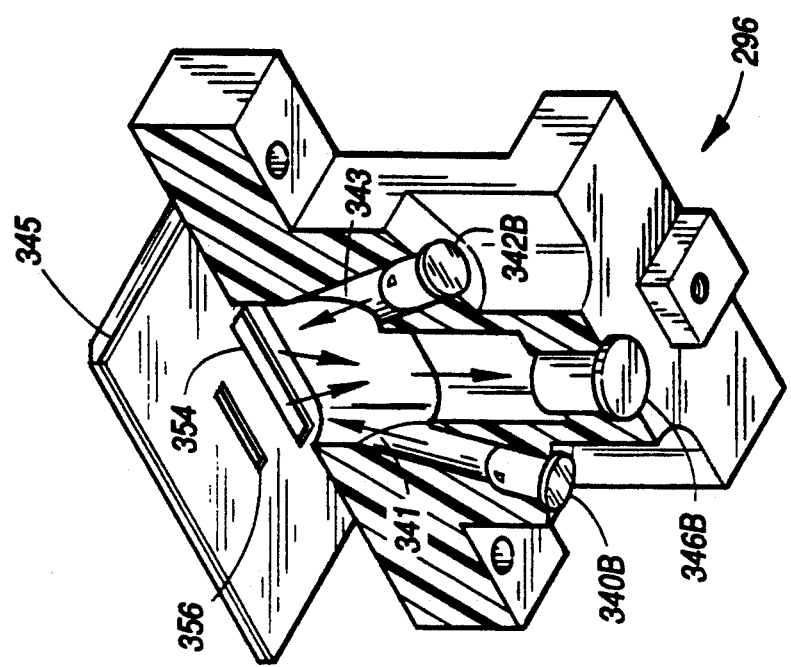
FIG. 17 is a bottom perspective view of the scanhead of FIG. 16, with the body portion of the scanhead sectioned along a vertical plane passing through the wide slit at the top of the scanhead.

According to a preferred embodiment, the optical scanhead comprises a plurality of light sources acting in combination to uniformly illuminate light strips of the desired dimension upon currency bills positioned on the transport path below the scanhead. As illustrated in FIGS. 17–18, the scanhead 296 includes a pair of LEDs 340, 342, directing beams of light 341A and 343B, respectively, onto the flat section 274 of the output path against which the scanhead is positioned. The LEDs 340, 342 are angularly disposed relative to the vertical axis Y in such a way that their respective light beams combine to illuminate the desired light strip. The scanhead 296 includes a photodetector 346 centrally disposed on an axis normal to the illuminated strip for sensing the light reflected off the strip. The photodetector 346 is linked to a central processing unit (CPU) (not shown) for processing the sensed data in accordance with the above-described principles of this invention. Preferably, the beams of light 340A, 340B from the LEDs 340, 342, respectively, are passed through an optical mask 345 in order to realize the illuminated strips of the desired dimensions.

Figure 19:
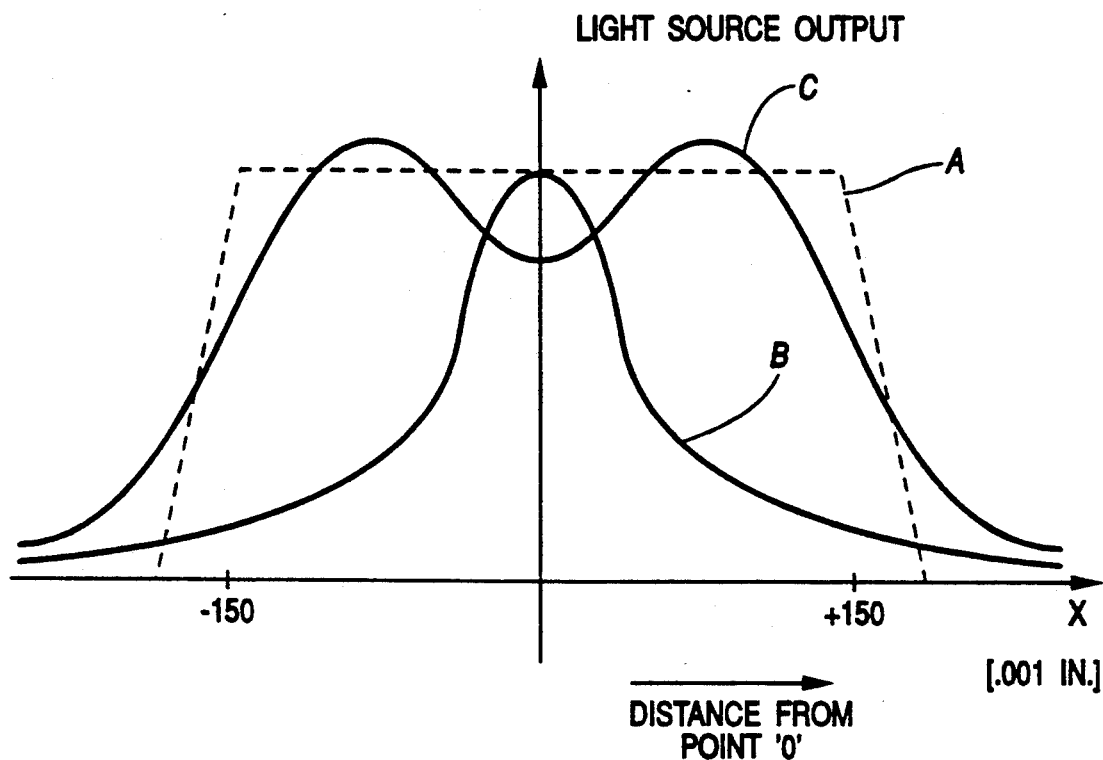
FIG. 19 is an illustration of the light distribution produced about the optical scanhead.

In order to capture reflectance samples with high accuracy, it is important that the photodetector capture reflectance data uniformly across the illuminated strip. In other words, when the photodetector 346 is positioned on an axis passing through the center of the illuminated strip, the illumination by the LEDs as a function of the distance from the central point "0" along the X axis, should optimally approximate a step function as illustrated by the curve A in FIG. 19. With the use of a single light source angularly displaced relative to the vertical, the variation in illumination by an LED typically approximates a Gaussian function, as illustrated by the curve B in FIG. 19.

In accordance with a preferred embodiment, the two LEDs 340 and 342 are angularly disposed relative to the vertical axis by angles $\alpha$ and $\beta$, respectively. The angles $\alpha$ and $\beta$ are selected to be such that the resultant strip illumination by the LEDs is as close as possible to the optimum distribution curve A in FIG. 19. According to a preferred embodiment, the angles $\alpha$ and $\beta$ are each selected to be 19.9 degrees. The LED illumination distribution realized by this arrangement is illustrated by the curve designated as "C" in FIG. 19 which effectively merges the individual Gaussian distributions of each light source to yield a composite distribution which sufficiently approximates the optimum curve A.

Figure 16:
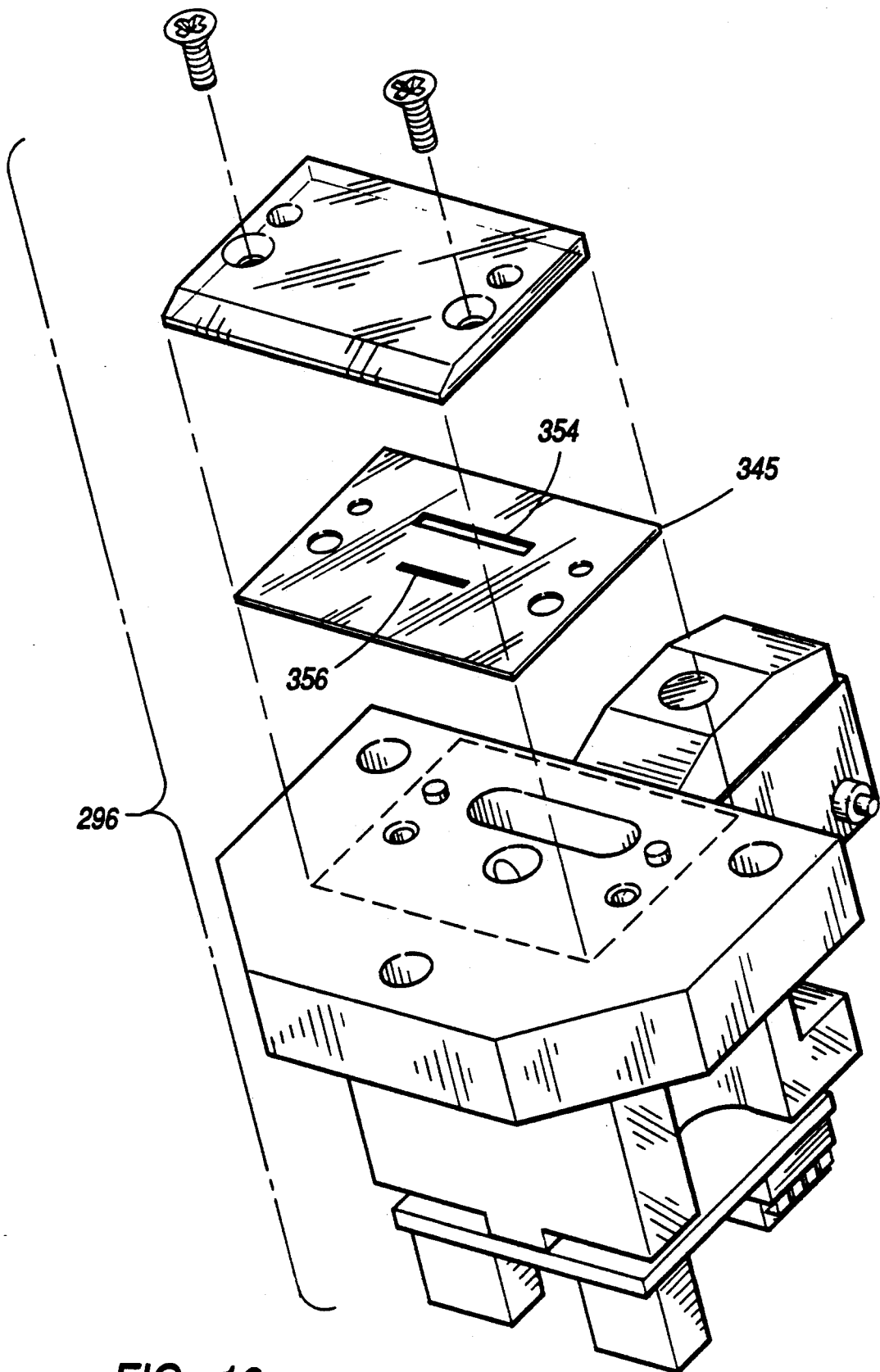
FIG. 16 is an exploded top perspective view of the optical scanhead used in the system of FIGS. 1-15.

The manner in which the plurality of light strips of different dimensions are generated by the optical scanhead by means of an optical mask is illustrated in FIG. 16–18. As shown therein, the optical mask 345 essentially comprises a generally opaque area in which two slits 354 and 356 are formed to allow light from the light sources to pass through so as to illuminate light strips of the desired dimensions. More specifically, slit 354 corresponds to the wide strip used for obtaining the reflectance samples which correspond to the characteristic pattern for a test bill. In a preferred embodiment, the wide slit 354 has a length of about 0.500" and a width of about 0.050". The second slit 356 forms a relatively narrow illuminated strip used for detecting the thin borderline surrounding the printed indicia on currency bills, as described above in detail. In a preferred embodiment, the narrow slit 356 has a length of about 0.300" and a width of about 0.010".

It is preferred that a separate pair of light sources 340 and 342 be provided for each of the two slits 354 and 356. Thus, as can be seen in FIGS. 17 and 18, a first pair of LEDS 340A and 342A are provided for the narrow slit, and a second pair of LEDs 340B and 342B are provided for the second slit. Similarly, two separate photodetectors 346A and 346B are provided for detecting reflected light from the two slits. As can be seen in FIGS. 17 and 18, the channel for transmitting reflected light from the narrow slit to the photodetector 346A is narrower in the transverse direction than the channel for transmitting reflected light from the wide slit to the photodetector 346B.

Figure 20:
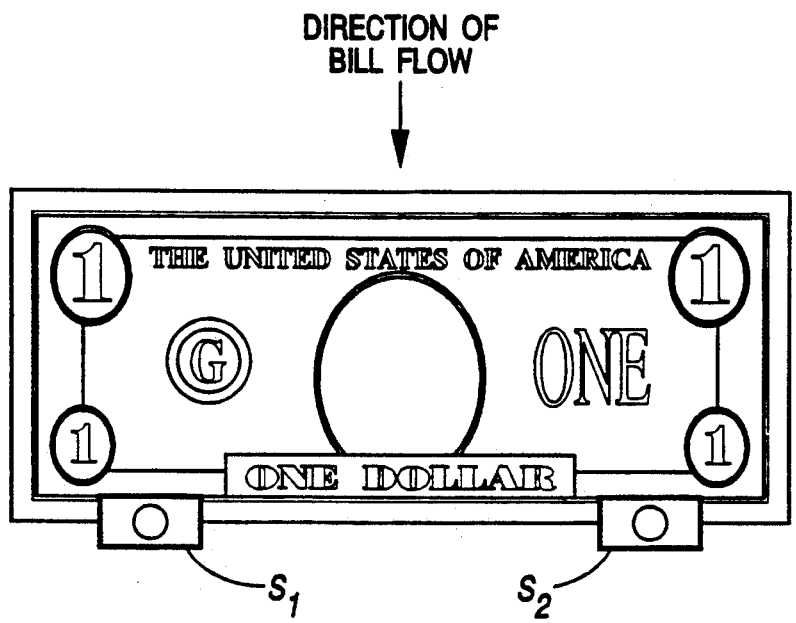
FIG. 20 is a diagrammatic illustration of the location of two auxiliary photo sensors relative to a bill passed thereover by the transport mechanism shown in FIGS. 11-15.

According to another feature of the present invention, the undesired doubling or overlapping of bills in the transport system is detected by the provision of a pair of optical sensors which are co-linearly disposed opposite to each other within the scan head area along a line that is perpendicular to the direction of bill flow, i.e., parallel to the edge of test bills along their wide dimensions as the bills are transported across the optical scan head. As best illustrated in FIG. 20, the pair of optical sensors S1 and S2 (having corresponding light sources and photodetectors which are not shown here) are co-linearly disposed within the scan head area in close parallelism with the wide dimension edges of incoming test bills. In effect, the optical sensors S1 and S2 are disposed opposite each other along a line within the scan head area which is perpendicular to the direction of bill flow.

It should be noted that FIGS. 11, 13 and 15 also include an illustration of the physical disposition of the sensors S1 and S2 within the optical scanhead area of the currency recognition and counting apparatus. For purposes of clarity, the sensors S1 and S2 are represented only in the form of blocks which correspond to the light sources associated with the sensors. Although not illustrated in the drawings, it should be noted that corresponding photodetectors (not shown) are provided within the scanhead area in immediate opposition to the corresponding light sources and underneath the flat section of the transport path. These detectors detect the beam of coherent light directed downwardly onto the bill transport path from the light sources corresponding to the sensors S1 and S2 and generate an analog output which corresponds to the sensed light. Each such output is converted into a digital signal by a conventional ADC convertor unit (not shown) whose output is fed as a digital input to and processed by the system CPU (not shown), in a manner similar to that indicated in the arrangement of FIG. 1.

The presence of a bill which passes under the sensors S1 and S2 causes a change in the intensity of the detected light, and the corresponding change in the analog output of the detectors serves as a convenient means for density-based measurements for detecting the presence of "doubles" (two or more overlaid or overlapped bills) during the currency recognition and counting process. For instance, the sensors may be used to collect a predefined number of density measurements on a test bill, and the average density value for a bill may be compared to predetermined density thresholds (based, for instance, on standardized density readings for master bills) to determine the presence of overlaid bills or doubles.

Figure 21:
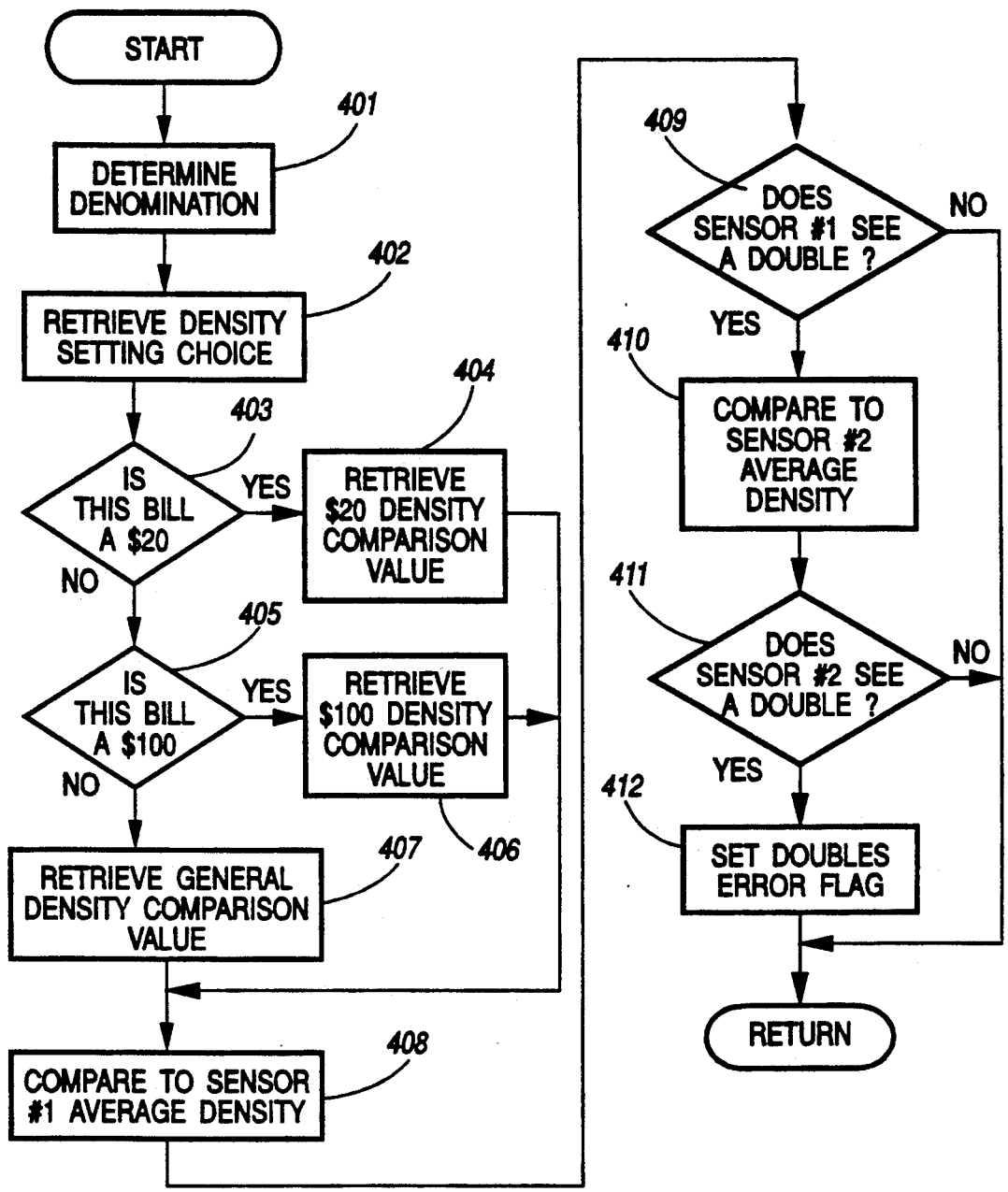
FIGS. 21-24 are flow charts illustrating the sequence of operations involved in various enhancements to the operating program for the basic optical sensing and correlation process.

A routine for using the outputs of the two sensors S1 and S2 to detect any doubling or overlapping of bills is illustrated in FIG. 21. This routine starts when the demonination of a scanned bill has been determined at step 401, as described previously. To permit variations in the sensitivity of the density measurement, a "density setting choice" is retrieved from memory at step 402. The operator makes this choice manually, according to whether the bills being scanned are new bills, requiring only a high degree of sensitivity, or used bills, requiring a lower level of sensitivity. After the "density setting choice" has been retrieved, the system then proceeds through a series of steps which establish a density comparison value according to the denomination of the bill. Thus, step 403 determines whether the bill has been identified as a $20 -bill, and if the answer is affirmative, the $20-bill density comparison value is retrieved from memory at step 404. A negative answer at step 403 advances the system to step 405 to determine whether the bill has been identified as a $100-bill, and if the answer is affirmative, the $100-bill density comparison value is retrieved from memory at step 406. A negative answer at step 405 advances the system to step 407 where a general density comparison value, for all remaining bill denominations, is retrieved from memory.

At step 408, the density comparison value retrieved at step 404, 406 or 407 is compared to the average density represented by the output of sensor S1. The result of this comparison is evaluated at step 409 to determine whether the output of sensor S1 identifies a doubling of bills for the particular denomination of bill determined at step 401. If the answer is negative, the system returns to the main program. If the answer is affirmative, step 410 then compares the retrieved density comparison value to the average density represented by the output of the second sensor S2. The result of this comparison is evaluated at step 401 to determine whether the output of sensor S2 identifies a doubling of bills. Affirmative answers at both step 409 and step 411 results in the setting of a "doubles error" flag at step 412, and the system then returns to the main program. The "doubles error" flag can, of course, be used to stop the bill transport motor.

Figure 22:
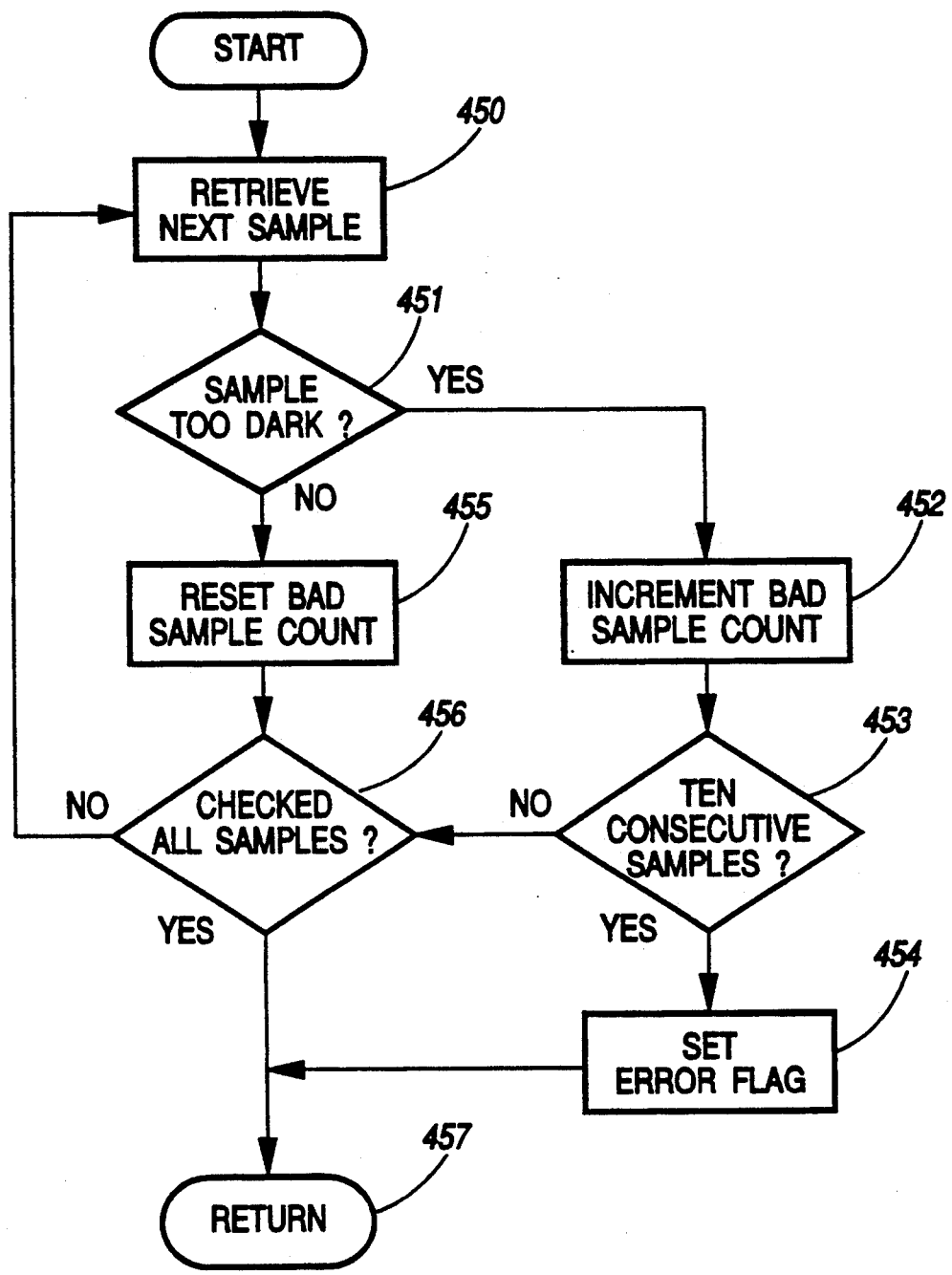

FIG. 22 illustrates a routine that enables the system to detect bills which have been badly defaced by dark marks such as ink blotches, felt-tip pen marks and the like. Such sever defacing of a bill can result in such distorted scan data that the data can be interpreted to indicate the wrong denomination for the bill. Consequently, it is desirable to detect such severely defaced bills and then stop the bill transport mechanism so that the bill in question can be examined by the operator.

The routine of FIG. 22 retrieves each successive data sample at step 450 and then advances to step 451 to determine whether that sample is too dark. As described above, the output voltage from the photodetector 26 decreases as the darkness of the scanned area increases. Thus, the lower the output voltage from the photodetector, the darker the scanned area. For the evaluation carried out at step 451, a preselected threshold level for the photodetector output voltage, such as a threshold level of about 1 volt, is used to designate a sample that is "too dark."

An affirmative answer at step 451 advances the system to step 452 where a "bad sample" count is incremented by one. A single sample that is too dark is not enough to designate the bill as seriously defaced. Thus, the "bad sample" count is used to determine when a preselected number of consecutive samples, e.g., ten consecutive samples, are determined to be too dark. From step 452, the system advances to step 453 to determine whether ten consecutive bad samples have been received. If the answer is affirmative, the system advances to step 454 where an error flag is set. This represents a "no call" condition, which causes the bill transport system to be stopped in the same manner discussed above in connection with FIG. 8A.

When a negative response is obtained at step 451, the system advances to step 455 where the "bad sample" count is reset to zero, so that count always represents the number of consecutive bad samples received. From step 455 the system advances to step 456 which determines when all the samples for a given bill have been checked. As long as step 456 yields a negative answer, the system continues to retrieve successive samples at step 450. When an affirmative answer is produced at step 456, the system returns to the main program at step 457.

Figure 23:
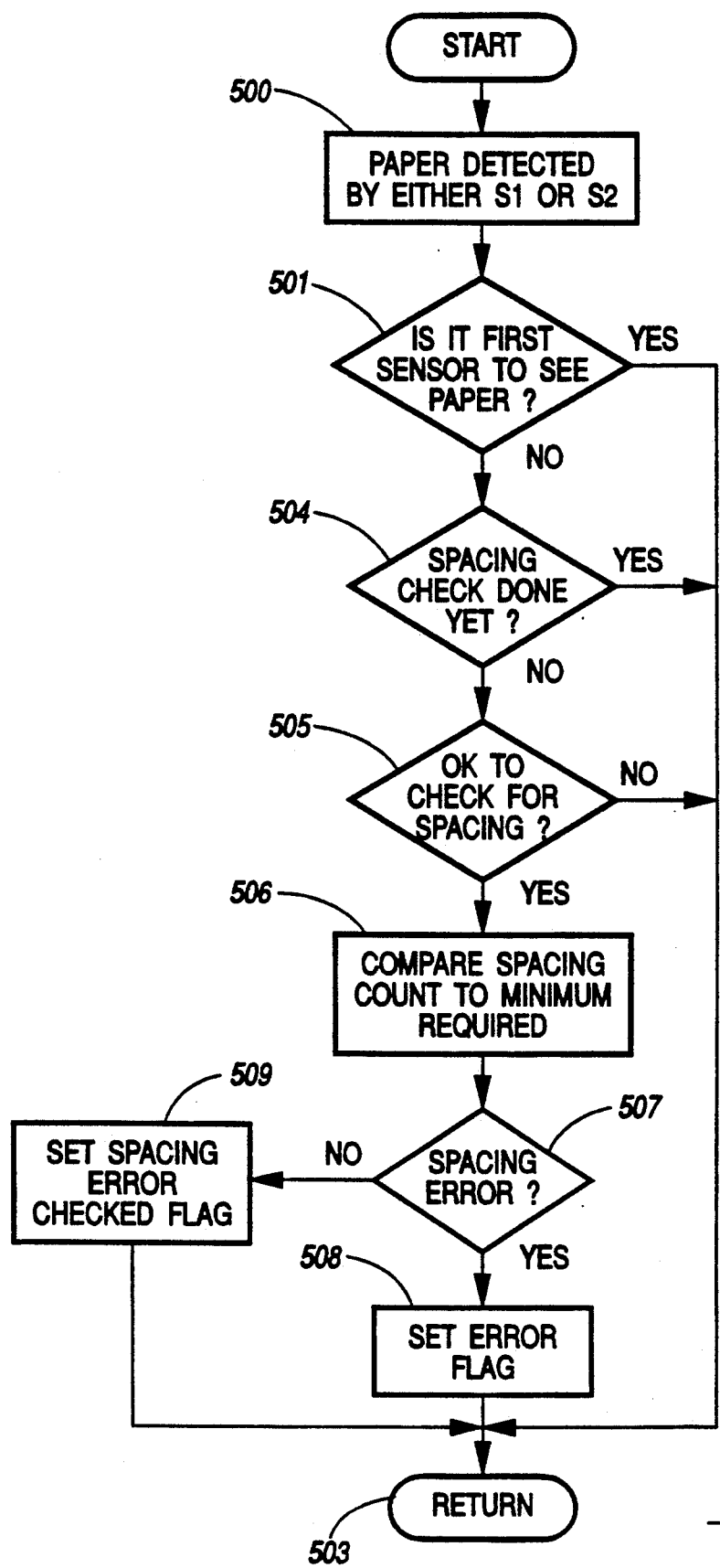

It is desirable to maintain a predetermined space between each pair of successive bills to facilitate the resetting of the scanning system between the trailing edge of the scanned area on one bill and the leading borderline on the next bill. The routine for performing this spacing check is illustrated in FIG. 23. This routine begins with step 500, which checks the output signals from the sensors S1 and S2 to determine when the leading edge of a bill is detected by either sensor. The detection of a predetermined change in the output from either sensor S1 or S2 advances the system to step 501, which determines whether the detected output change is from the first sensor to see the leading edge of a bill. If the answer is affirmative the system returns to the main program at step 503. A negative response at step 501 advances the system to step 504 to determine whether the spacing check is done yet. If the answer is "yes," the system returns to the main program. If the answer is "no," step 505 determines whether a spacing check is to be performed, based on whether the first bill in a new stack of bills placed in the CRU has been detected. That is, there is no need to initiate a spacing check until the first bill reaches the sensors S1 and S2. Thus, a negative answer at step 505 returns the system to the main program, while an affirmative answer advances the system to step 506 which compares the actual spacing count, i.e., the number of encoder pulses produced after detection of the leading edge of the bill, to a preselected minimum spacing count retrieved from memory. If the actual spacing count is above the preselected minimum, there is no error and consequently the next step 507 yields a negative response, indicating that there is no spacing error. Thi negative response sets a "spacing error checked" flag at step 509. If the actual spacing count is below the preselected minimum, step 509 detects a spacing error and consequently produces an affirmative response which sets an error flag at step 508. The system then returns to the main program at step 503. It is this flag that is read at step 504.

Figure 24:
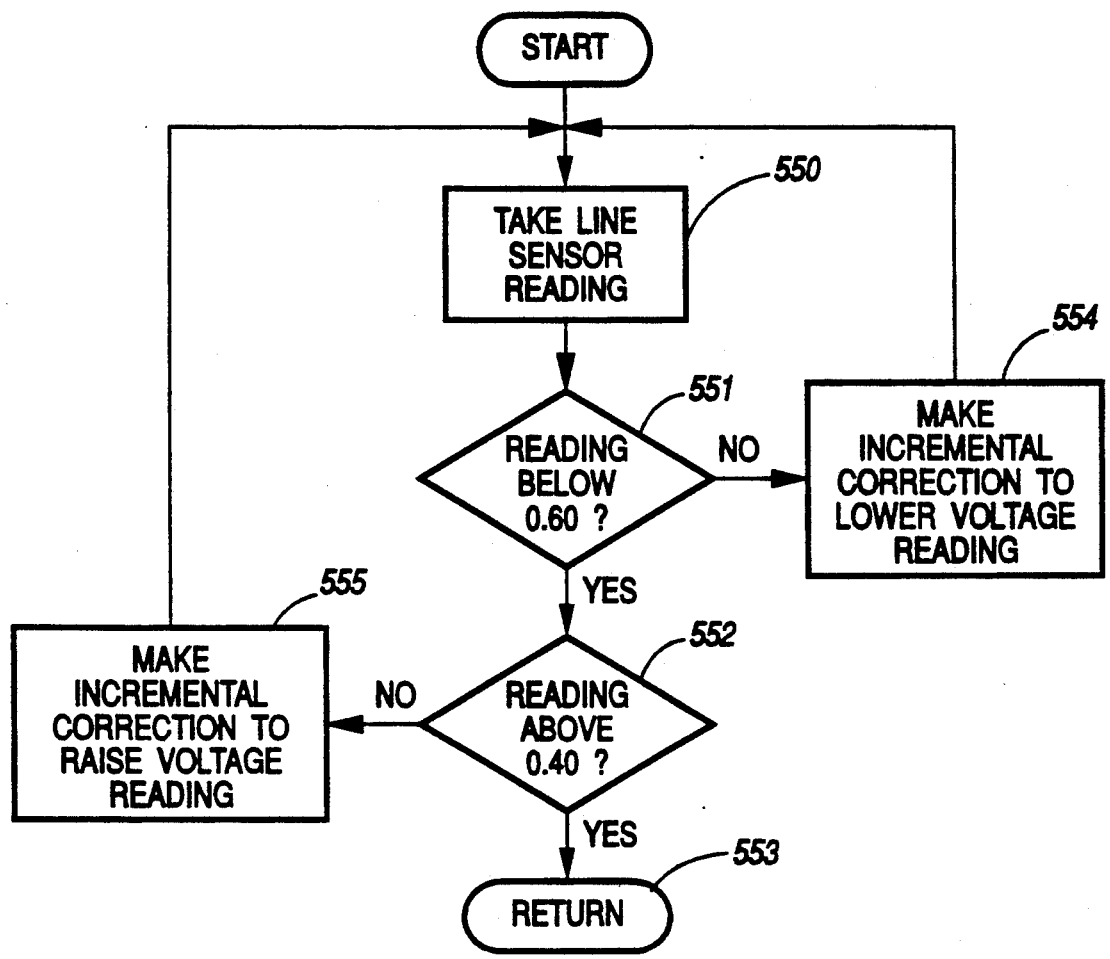

A routine for automatically monitoring and making any necessary corrections in various line voltages is illustrated in FIG. 24. This routine is useful in automatically compensating for voltage drifts due to temperature changes, aging of components and the like. The routine starts at step 550 which reads the output of a line sensor which is monitoring a selected voltage. Step 551 determines whether the reading is below 0.60, and if the answer is affirmative, step 552 determines whether the reading is above 0.40. If step 552 also produces an affirmative response, the voltage is within the required range and thus the system returns to the main program step 553. If step 551 produces a negative response, an incremental correction is made at step 554 to reduce the voltage in an attempt to return it to the desired range. Similarly, if a negative response is obtained at step 552, an incremental correction is made at step 555 to increase the voltage toward the desired range.

We claim:

1. A currency counting and evaluation device for receiving a stack of currency bills, rapidly counting and evaluating all the bills in the stack, and then re-stacking the bills, said device comprising
   a feed mechanism for receiving a stack of currency bills and feeding said bills in the direction of the narrow dimension of the bills, one at a time, to a feed station,
   a bill transport mechanism for transporting bills, in the direction of the narrow dimension of the bills, from said feed station to a stacking station, at a rate in excess of about 800 bills per minute,
   a stationary optical scanning head located between said feed and stacking stations for scanning a preselected segment of a central portion of each bill transported between said stations by said transport mechanism, said scanning head including at least one light source for illuminating a strip of said preselected segment of a bill, and at least one detector for receiving reflected light from the illuminated strip on the bill and producing an output signal representing variations in the intensity of the reflected light,
   means for sampling said output signal at preselected intervals as a bill is moved across said scanning head in the direction of the narrow dimension of the bill, each of said output signal samples being proportional to the intensity of the light reflected from a different strip of said preselected segment of a bill,
   a memory for storing characteristic signal samples produced by scanning said preselected segments of bills of different denominations with said scanning head and sampling said output signal at said preselected intervals, each of said stored signal samples being proportional to the intensity of the light reflected from a different strip of said preselected segment of a bill, and
   signal processing means for receiving said signal samples and (1) determining the denomination of each scanned bill by comparing said stored signal samples with said output signal samples produced by the scanning of each bill with said scanning head, (2) counting the number of scanned bills of each denomination, and (3) accumulating the cumulative value of the scanned bills of each denomination.

2. The currency counting and evaluation device of claim 1 which includes an encoder coupled to said transport mechanism for monitoring the movement of each bill by producing a repetitive tracking signal synchronized with incremental movements of said transport mechanism, and means urging each bill into firm engagement with said transport mechanism and said scanning head to ensure a fixed relationship between the increments of movement of each bill and the corresponding increments of movement of said transport mechanism which is synchronized with said encoder.

3. The currency counting and evaluation device of claim 1 wherein said transport mechanism is driven at a controllable speed.

4. The currency counting and evaluation device of claim 1 wherein said detector in said scanning head is a single photodetector which produces an electrical output signal proportional to the intensity of the light reflected from the scanned bill.

5. The currency counting and evaluation device of claim 4 which includes means for sampling said output signal at increments synchronized with said repetitive tracking signal, and at the same increments used in said characteristic signals stored in said memory.

6. The currency counting and evaluation device of claim 1 wherein said strips are dimensioned so that at least 50 different strips can be scanned in the direction of the narrow dimension of each bill.

7. The currency counting and evaluation device of claim 1 which includes means for detecting a borderline around the image printed on each bill, and wherein said preselected segment is located inside said borderline, and the scanning of said preselected segment is initiated at a prescribed interval following the detection of said borderline.

8. The currency counting and evaluation device of claim 1 wherein said preselected segment of each bill is located in the central region of the bill.

9. The currency counting and evaluation device of claim 1 wherein said feeding and stacking stations are both located at the front of said device, and said transport mechanism carries bills rearwardly away from said feed station and then returns the bills forwardly to said stacking station.

10. The currency counting and evaluation device of claim 9 wherein said transport mechanism forms a linear path for said bills on the upstream side of said stacking station, and said scanning head is located along said linear path.

11. The currency counting and evaluation device of claim 1 wherein said preselected segment of each bill is scanned in less than one tenth of a second.

12. The currency counting and evaluation device of claim 1 wherein said light source illuminates said preselected segment of each bill from opposite sides of said detector.

13. The currency counting and evaluation device of claim 1 which includes means for controlling the movement of a selected bill between said scanning head and the stacking station for that bill in response to said determination of the denomination of that bill.

14. The currency counting and evaluation device of claim 13 wherein said controlling means stops the movement of said selected bill between said scanning head and the stacking station for that bill.

15. The currency counting and evaluation device of claim 13 wherein said controlling means decelerates said selected bill before stopping the movement of that bill.

16. The currency counting and evaluation device of claim 13 wherein the denomination of each bill is determined before the leading edge of that bill reaches the stacking station for that bill.

17. The currency counting and evaluation device of claim 13 wherein said stacking station is spaced from said scanning head by a distance that is less than the width of two of said bills.

18. The currency counting and evaluation device of claim 1 which includes signal processing means responsive to the output signals from said detector for determining the denomination of each scanned bill before that bill has been advanced to a stacking station, and means responsive to said signal processing means for altering the movement of a scanned bill in response to the denomination determination for that bill, before that bill is advanced to a stacking station.

* * * * *